US012726268B2

(12) United States Patent
Gupta et al.

(10) Patent No.: US 12,726,268 B2
(45) Date of Patent: Sep. 1, 2026

(54) FREQUENCY DIVISION DUPLEXING OPERATION OF AMBIENT INTERNET OF THINGS DEVICE

(71) Applicant: QUALCOMM Incorporated, San Diego, CA (US)

(72) Inventors: Piyush Gupta, Bridgewater, NJ (US); Raviteja Patchava, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 389 days.

(21) Appl. No.: 18/349,741

(22) Filed: Jul. 10, 2023

(65) Prior Publication Data

US 2025/0038841 A1 Jan. 30, 2025

(51) Int. Cl.

| | |
|---|---|
| ***H04B 7/22*** | (2006.01) |
| ***H04L 5/00*** | (2006.01) |
| ***H04L 5/14*** | (2006.01) |
| ***H04W 72/1273*** | (2023.01) |

(52) U.S. Cl.

CPC ............. *H04B 7/22* (2013.01); *H04L 5/0048* (2013.01); *H04L 5/14* (2013.01); *H04W 72/1273* (2013.01)

(58) Field of Classification Search

CPC ........... H04B 7/22; H04L 5/0048; H04L 5/14; H04W 72/1273

See application file for complete search history.

(56) References Cited

U.S. PATENT DOCUMENTS

2019/0174438 A1 * 6/2019 Zhang ................ H04W 56/001

FOREIGN PATENT DOCUMENTS

WO WO-2023000209 A1 * 1/2023 ............ H04W 52/02

OTHER PUBLICATIONS

International Search Report and Written Opinion—PCT/US2024/035091—ISA/EPO—Nov. 4, 2024.

Moderator (Huawei): "Summary of Email Discussion [98e-11-Ambient-IoT]", 3GPP TSG RAN TSG Meeting #98-e, RP-22xxxx, e-Meeting, Dec. 12, 2022-Dec. 16, 2022, Dec. 1, 2022, pp. 1-114, XP093188466, Section 5.6.

* cited by examiner

*Primary Examiner* — Joseph E Avellino
*Assistant Examiner* — Maryam Emadi
(74) *Attorney, Agent, or Firm* — Procopio, Cory, Hargreaves & Savitch LLP

(57) ABSTRACT

The apparatus may be a network node configured to transmit, to a backscatter-capable device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device. The apparatus may further be configured to receive, via the third frequency range, the UL trigger indicating that the backscatter-capable device has information to transmit. The apparatus may also be configured to transmit, based on receiving the UL trigger and via the first frequency range, a CW DL transmission for backscattering from the backscatter-capable device and receive, via the second frequency range, the information from the backscatter-capable device via the CW DL transmission backscattered by the backscatter-capable device.

28 Claims, 21 Drawing Sheets

100
Service Management and Orchestration (SMO) Framework
105
115
Non-Real Time RAN Intelligent Controller (RIC)
O1
E2
A1
O2
O-eNB
111
Near-Real Time RAN Intelligent Controller (RIC)
125
O1
E2
110
CU
O-Cloud
190
Midhaul link
F1
Midhaul link
E2
130
Fronthaul link
DU
130
DU
Backhaul Link
120
Core Network
AMF 161
SMF 162
GMLC 165
UPF 163
LMF 166
UDM 164
Set of Location Servers 168
140
RU
Access link
104
UE
SPS
170
RU
140
182
184
UE
104
RU
140
104
UE
158
UE
104
154
150
199
Ambient IoT FDD Operation (AIoTFDD) Component
BS 102
CU
DU
RU
198
Ambient IoT FDD Operation (AIoTFDD) Component

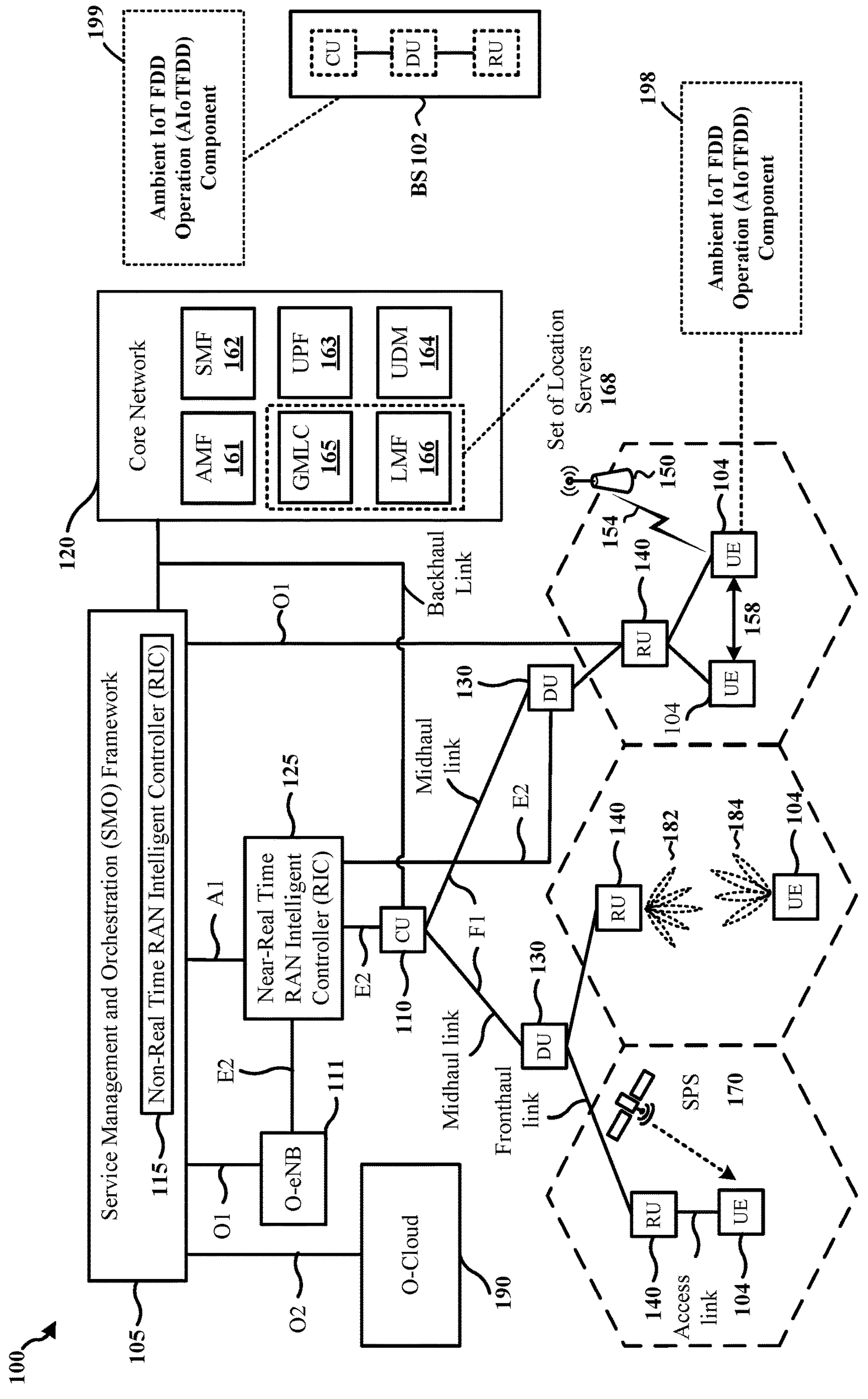

FIG. 1

1000
BS 1002
Passive IoT Device 1004
1006
FDD Configuration
1008
Synchronization
1009
Guard Time
1010
DL Transmission
DL 1011
Identify data for UL Tx
1012
Period 1060
1013
Guard Time
Monitor for (and decode) UL Tx
1016
CW/UL 1015
CW Tx 1017
Encode information in backscattered and frequency shifted Tx
1018
UL Tx 1019
Period 1060
1021
Guard Time
1022
DL Transmission
DL 1023
Identify lack of data for UL Tx
1024
1025
Guard Time
CW/UL 1027
1028
Monitor for (and decode) UL Tx
CW Tx 1029
Omit encoding information
1030

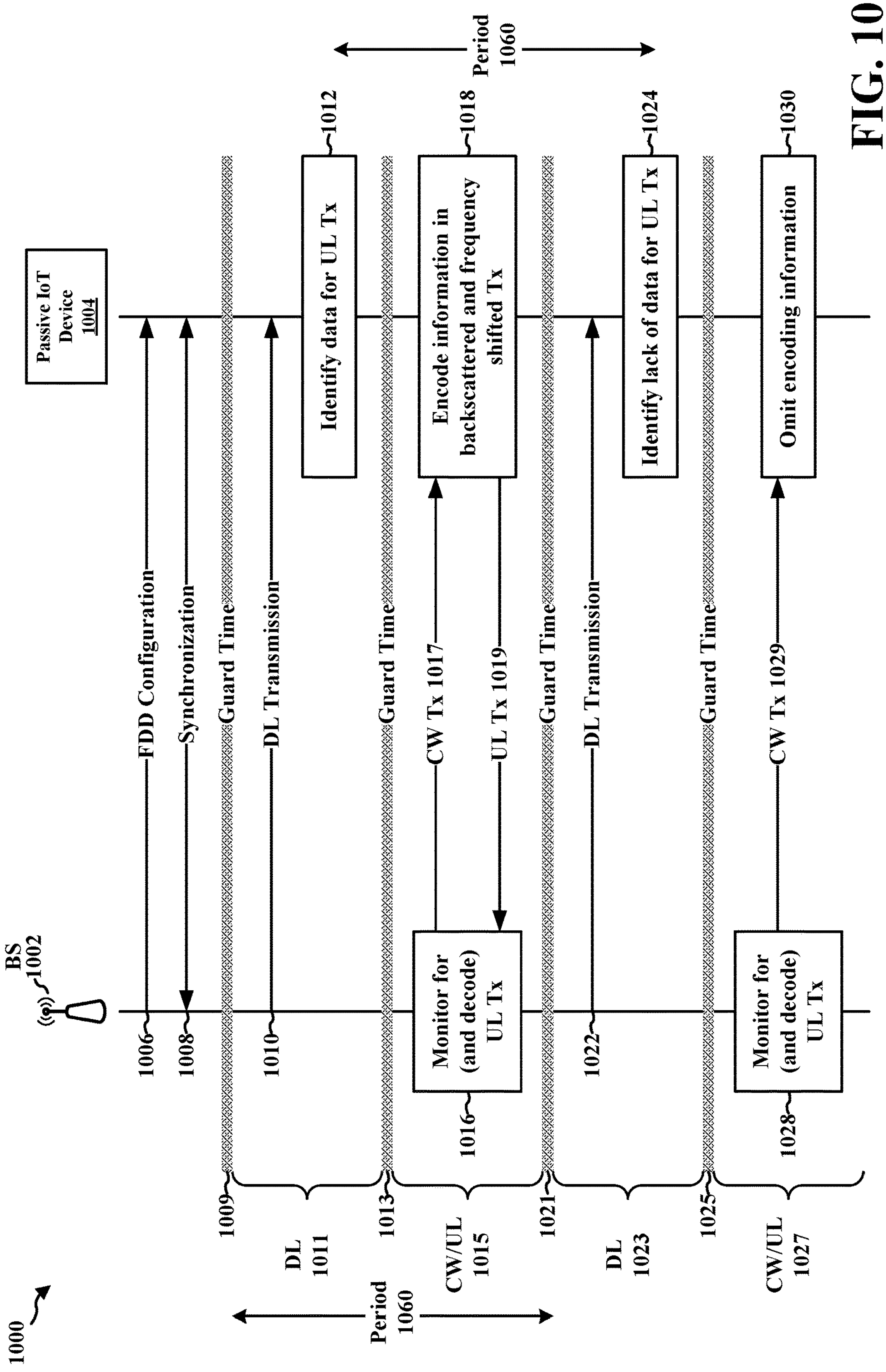

2010
CU Processor(s) 2012
AIoTFDD Component 199
Memory 2012'
Memory 2014
Communications Interface 2018

Midhaul Link

2030
DU Processor(s) 2032
AIoTFDD Component 199
Memory 2032'
Memory 2034
Communications Interface 2038

Fronthaul Link

2040
RU Processor(s) 2042
AIoTFDD Component 199
Memory 2042'
Memory 2044
Transceiver(s) 2046
Antennas 2080
Communications Interface 2048

FREQUENCY DIVISION DUPLEXING OPERATION OF AMBIENT INTERNET OF THINGS DEVICE

TECHNICAL FIELD

The present disclosure relates generally to communication systems, and more particularly, to a wireless device capable of backscattering a continuous wave (CW) transmission from a reader device with a frequency shift for a frequency division duplexing (FDD) operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a network node, or a reader device, configured to transmit, to a backscatter-capable device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device. The apparatus may further be configured to receive, via the third frequency range, the UL trigger indicating that the backscatter-capable device has information to transmit. The apparatus may also be configured to transmit, based on receiving the UL trigger and via the first frequency range, a CW DL transmission for backscattering from the backscatter-capable device and receive, via the second frequency range, the information from the backscatter-capable device via the CW DL transmission backscattered by the backscatter-capable device.

In an aspect of the disclosure, a method, a computer-readable medium, and an apparatus are provided. The apparatus may be a network node, or a reader device, configured to transmit, to a passive backscatter device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The apparatus may also be configured to transmit, via the set of time resources indicated by the third indication and via the first frequency range, the CW DL transmission for backscattering from the passive backscatter device and receive, via the second frequency range, the information from the passive backscatter device via the CW DL transmission backscattered by the passive backscatter device.

In an aspect of the disclosure, a method, a computer-readable medium, and an apparatus are provided. The apparatus may be a wireless device such as a backscatter device (e.g., a user equipment (UE) capable of backscattering a received signal) configured to receive, from a network device, a first indication of a first frequency range associated with a DL transmission, a second indication of a second frequency range associated with an UL communication from the backscatter-capable device, and a third indication of a third frequency range associated with an UL trigger from the backscatter-capable device. The apparatus may further be configured to transmit, via the third frequency range, the UL trigger indicating that the backscatter-capable device has information to transmit. The apparatus may also be configured to receive, based on the UL trigger and via the first frequency range, a CW DL transmission and backscatter, via the second frequency range, the CW DL transmission to include the information.

In an aspect of the disclosure, a method, a computer-readable medium, and an apparatus are provided. The apparatus may be a wireless device such as a passive backscatter device (e.g., a UE capable of backscattering a received signal) configured to receive, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The apparatus may also be configured to receive, via the set of time resources indicated by the third indication and via the first frequency range, the CW DL transmission for backscattering from the passive backscatter device and backscatter, via the second frequency range, the CW DL transmission to include the information.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 1 is a diagram illustrating an example of a wireless communications system and an access network.

FIG. 10 is a call flow diagram illustrating a method of wireless communication associated with FDD operation of an IoT device in accordance with some aspects of the disclosure.

DETAILED DESCRIPTION

Figures 2A, 2B, 2C, 2D:
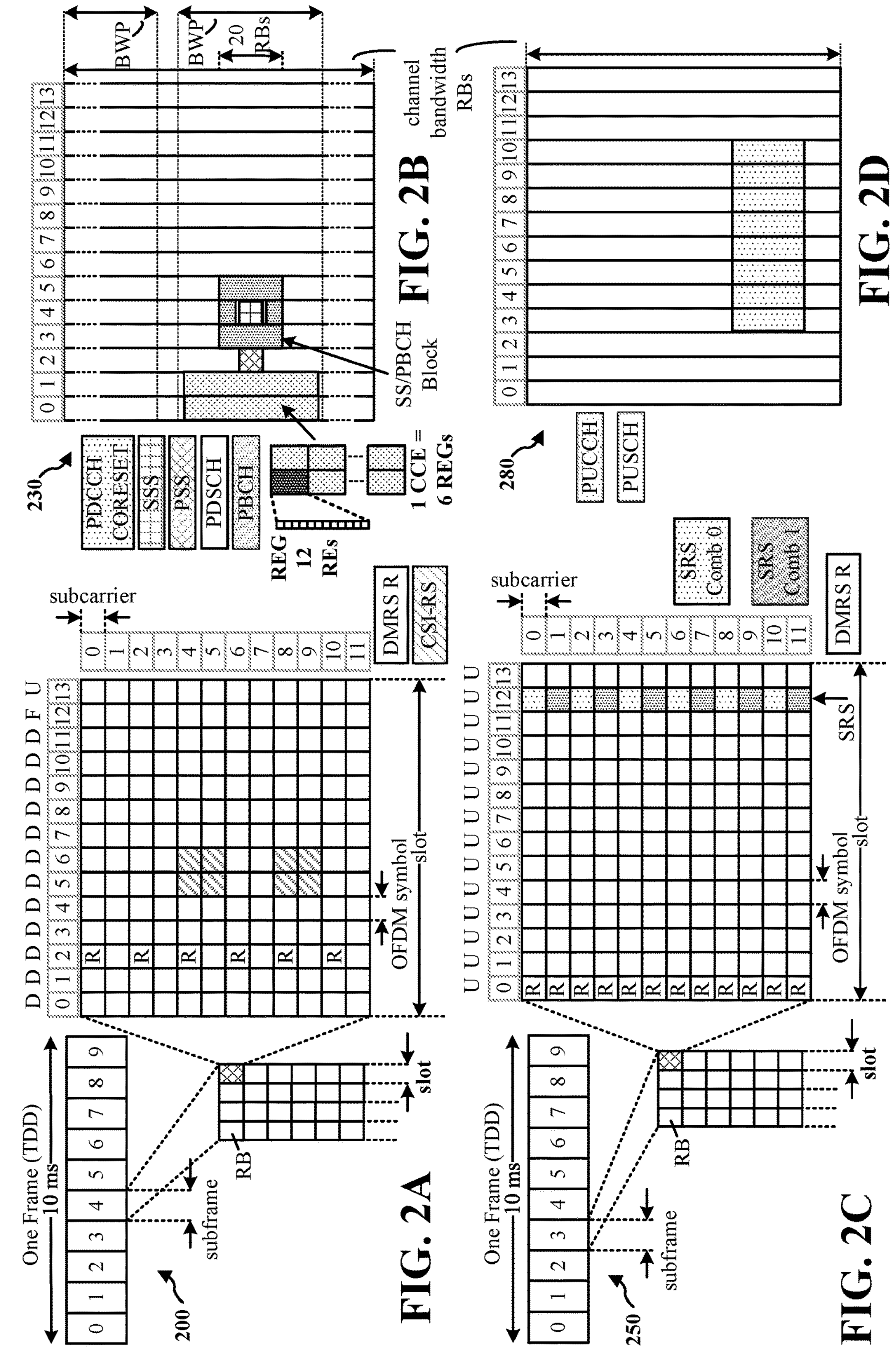
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Radio frequency identifiers (RFID) is a rapidly growing technology impacting many industries due to its economic potential for inventory and/or asset management in a warehouse, IoT, sustainable sensor networks in factories and/or agriculture, and smart homes. In some aspects, an RFID device consists of small transponders, or tags, emitting an information-bearing signal upon receiving a signal. An RFID device may be operated, in some aspects, without battery at a low operational expenditure (OPEX), low maintenance cost, and long life-cycle. Passive RFID can harvest energy over the air and power the transmission/reception circuitry where the transmitted signal is typically backscatter modulated. Other types of RFID tags and/or RFID devices may include battery sources and/or additional components for "active" communications (e.g., communication that does not rely on backscattering a received signal). For example, semi-passive RFID devices and active RFID devices may have a battery source and Tx/Rx circuitry capable of using energy from the battery source, but may also be associated with a higher cost.

As wireless communication expands to more industrial verticals besides eMBB, e.g., URLLC, and MTC, it may additionally be expanded to support passive IoT. As IoT devices become more pervasive, some applications, e.g., asset management, logistics, warehousing and manufacturing, may involve capabilities beyond RFID at a base station or reader interacting with the IoT devices. For example, a base station and/or reader may be called upon to read and/or write information stored on IoT devices, provide energy to the IoT devices, receive and decode reflected (backscattered) information-bearing signals from the IoT devices. Accordingly, while for traditional use of RFID devices (e.g., for passive IoT devices) communication may be initiated by the base station and/or reader by transmitting a waveform that may be backscattered by the RFID device with embedded information. However, for some applications (e.g., application with aperiodic traffic) there may be benefit to initiating communication, e.g., allowing UL communication, from an IoT device (e.g., a semi-passive, or active, IoT device). Initiating communications from an IoT device may be suitable for low latency sensing applications, and may scale well with high IoT device densities.

Various aspects relate generally to enabling FDD operation to provide a mechanism for an IoT device (e.g., a passive, or semi-passive, IoT device or component) to initiate traffic in association with ambient IoT (e.g., an UL transmission via backscattering). Some aspects more specifically relate to providing a configuration and an associated method for initiating ambient IoT communication from an IoT device (e.g., a passive, semi-passive, or active, IoT device). In some examples, a base station and/or reader may transmit, and a backscatter-capable device may receive, a first indication of a first frequency range associated with a DL transmission, a second indication of a second frequency range associated with an UL communication from the backscatter-capable device, and a third indication of a third frequency range associated with an UL trigger from the backscatter-capable device. The backscatter-capable device may be configured to transmit, and the base station and/or reader may further be configured to receive, via the third frequency range, the UL trigger indicating that the backscatter-capable device has information to transmit. The base station and/or reader may also be configured to transmit, based on receiving the UL trigger and via the first frequency range, a CW DL transmission for backscattering from the backscatter-capable device. The backscatter-capable device may be configured to receive, based on the UL trigger and via the first frequency range, a CW DL transmission and backscatter, via the second frequency range, the CW DL transmission to include the information. The base station and/or reader may also be configured to receive, via the second frequency range, the information from the backscatter-capable device via the CW DL transmission backscattered by the backscatter-capable device.

In some examples, a base station and/or reader may transmit, and a passive backscatter device may receive, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The base station and/or reader may also be configured to transmit, via the set of time resources indicated by the third indication and via the first frequency range, the CW DL transmission for backscattering from the passive backscatter device. The passive backscatter device may be configured to receive, via the set of time resources indicated by the third indication and via the first frequency range, the CW DL transmission for backscattering from the passive backscatter device and backscatter, via the second frequency range, the CW DL transmission to include the information. The base station and/or reader may also be configured to receive, via the second frequency range, the information from the passive backscatter device via the CW DL transmission backscattered by the passive backscatter device.

Particular aspects of the subject matter described in this disclosure can be implemented to realize one or more of the following potential advantages. In some examples, by providing communication capabilities for IoT devices (e.g., IoT tags associated with a sensor or meter), the described techniques can be used to enable data reporting for ambient IoT devices (e.g., sensors or meters).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an ambient IoT FDD operation (AIoTFDD) component 198 that may be configured to receive, from a network device, a first indication of a first frequency range associated with a DL transmission, a second indication of a second frequency range associated with an UL communication from the backscatter-capable device, and a third indication of a third frequency range associated with an UL trigger from the backscatter-capable device. The AIoTFDD component 198 may further be configured to transmit, via the third frequency range, the UL trigger indicating that the backscatter-capable device has information to transmit. The AIoTFDD component 198 may also be configured to receive, based on the UL trigger and via the first frequency range, a CW DL transmission and backscatter, via the second frequency range, the CW DL transmission to include the information.

In some aspects, the AIoTFDD component 198 may be configured to receive, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The AIoTFDD component 198 receive, via the set of time resources indicated by the third indication and via the first frequency range, the CW DL transmission for backscattering from the passive backscatter device and backscatter, via the second frequency range, the CW DL transmission to include the information.

In certain aspects, the base station 102 may have an AIoTFDD component 199 that may be configured to transmit, to a backscatter-capable device, a first indication of a first frequency range associated with a DL transmission, a second indication of a second frequency range associated with an UL communication from the backscatter-capable device, and a third indication of a third frequency range associated with an UL trigger from the backscatter-capable device. The AIoTFDD component 199 may further be configured to receive, via the third frequency range, the UL trigger indicating that the backscatter-capable device has information to transmit. The AIoTFDD component 199 may also be configured to transmit, based on receiving the UL trigger and via the first frequency range, a CW DL transmission for backscattering from the backscatter-capable device and receive, via the second frequency range, the information from the backscatter-capable device via the CW DL transmission backscattered by the backscatter-capable device.

In some aspects, the AIoTFDD component 199 may be configured to transmit, to a backscatter-capable device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The AIoTFDD component 199 transmit, via the set of time resources indicated by the third indication and via the first frequency range, the CW DL transmission for backscattering from the passive backscatter device and receive, via the second frequency range, the information from the passive backscatter device via the CW DL transmission backscattered by the passive backscatter device. Although the following description may be focused on passive or semi-passive IoT devices, the concepts described herein may be applicable to other types of devices, such as active IoT devices or backscatter-capable UEs to reduce power usage at the device.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2$\mu$ slots/subframe. The subcarrier spacing may be equal to $2^{\mu}$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
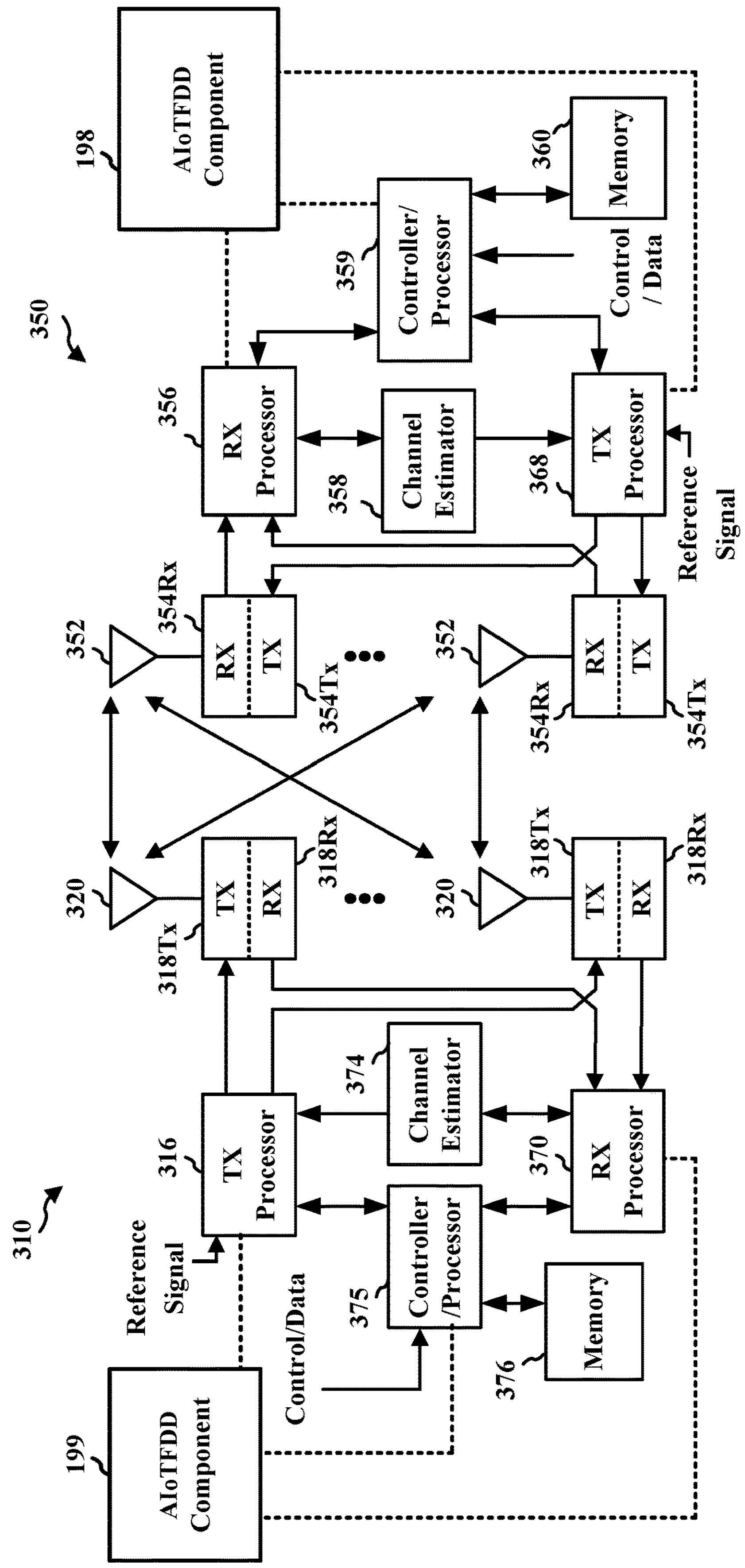
FIG. 3 is a diagram illustrating an example of a base station and UE in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the AIoTFDD component 198 of FIG. 1.

At least one of the TX processor 316, the RX processor 370, and the controller/processor 375 may be configured to perform aspects in connection with the AIoTFDD component 199 of FIG. 1.

Figure 4:
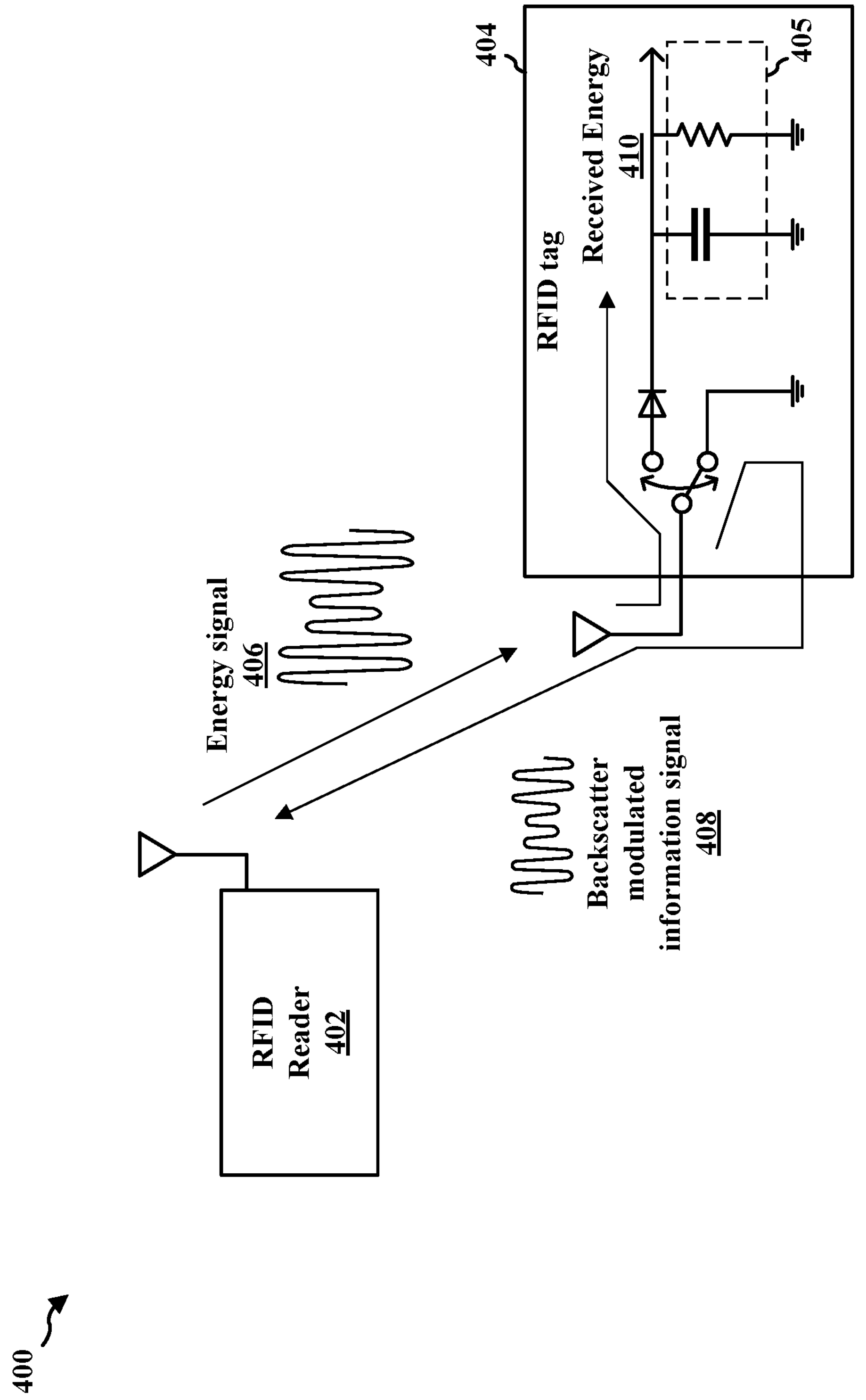
FIG. 4 illustrates a diagram of an RFID tag that receives an energy transfer signal from an RFID reader.

FIG. 4 illustrates a diagram 400 of an RFID tag 404 that receives an energy transfer signal 406 from an RFID reader 402. Such an RFID tag 404 is one example of an energy receiver and/or backscatter-capable device that may obtain energy from an energy transfer signal (or an energy signal) from an energy transmitter (e.g., the RFID reader 402). The RFID tag 404, in some aspects, may also be described as, or comprise, an RFID device, an RF integrated circuit (RFIC), an RFID chip, a backscatter device, or an IoT device. An energy transfer signal 406 (e.g., a CW transmission or signal) may be used for various industrial IoT (IIoT) applications. For example, RFID technology may be used for inventory/asset management both inside and outside of warehouses, network sensors in factories, logistics devices, manufacturing settings, agricultural applications, smart homes, or other applications. RFID technology may also be deployed in association with cellular infrastructure for wireless applications. RFID devices may include a transponder (e.g., the RFID tag 404) that emits an information-bearing signal, such as a backscattered modulated information signal 408, upon receiving a signal from the RFID reader 402. That is, the RFID reader 402 may transmit the energy transfer signal 406 as well as an information signal to a passive RFID microchip (e.g., RFID tag 404) that operates without a battery source.

The RFID tag 404 may be configured to operate without the battery source at a low OPEX, low maintenance cost, and/or increased lifecycle. Other types of RFID tags may include battery sources. For example, semi-passive RFID devices and active RFID devices may have a battery source, but may also be associated with a higher cost. If the RFID reader 402 is able to provide enough received energy 410 to the RFID tag 404, the RFID tag 404 may harvest the received energy 410 to perform an operation during communication occasions or may harvest the received energy 410 to charge an associated battery. Passive RFID tags may harvest the received energy 410 over-the-air in order to power Tx/Rx circuitry at the RFID tag 404. The energy transfer signal 406 transmitted to the RFID tag 404 may trigger the backscattered modulated information signal 408 from the RFID tag 404. The RFID tag 404 may absorb or reflect signals from the RFID reader 402 based on the information to be communicated between the RFID tag 404 and the RFID reader 402. The RFID tag 404 may include a decreased number of active RF components (e.g., no active RF component) in some cases. By increasing a coverage area of the energy transfer signal 406, the RFID reader 402 and the RFID tag 404 may communicate at longer physical distances.

Wireless communication techniques associated with eMBB, URLLC, machine-type communication (MTC), etc., may be supported for passive IoT devices. Passive IoT devices are another example of an energy receiving device, such as energy receiving device 405 in FIG. 4. In examples, the RFID reader 402 may correspond to a base station or an entity at a base station, and the RFID tag 404 may correspond to a UE or be in communication with the UE. However, some wireless communication techniques may not support certain types of widespread RFID technology, such as passive IoT devices used for asset management, logistics, warehousing, and manufacturing, etc. Among other examples, passive IoT devices may include timing devices such as clocks, video devices, household tools, construction tools, lighting systems, etc.

In some aspects, the wireless communication techniques may support wireless energy transmission (WET), wireless power transmission (WPT), and/or wireless information transmission (WIT) to incorporate passive IoT devices into wireless networks. Using a cellular infrastructure, a base station/network entity may operate as the RFID reader 402 that transmits the energy transfer signal 406 to the RFID tag 404 for communicating with the passive IoT devices via RFID technology. The base station/network entity may provide energy to the passive IoT devices via the energy transfer signal 406 and may be configured to read/write information stored at the passive IoT devices. Information-bearing signals may be reflected from the passive IoT devices to the base station/network entity, which may read the reflected signal. For instance, the base station/network entity may decode information included in the information-bearing signals (e.g., backscattered modulated information signal 408) received from the passive IoT devices (e.g., RFID tag 404). In some aspects, the backscattered modulated information signal 408 may be frequency-shifted in relation to the energy transfer signal 406.

Figure 5:
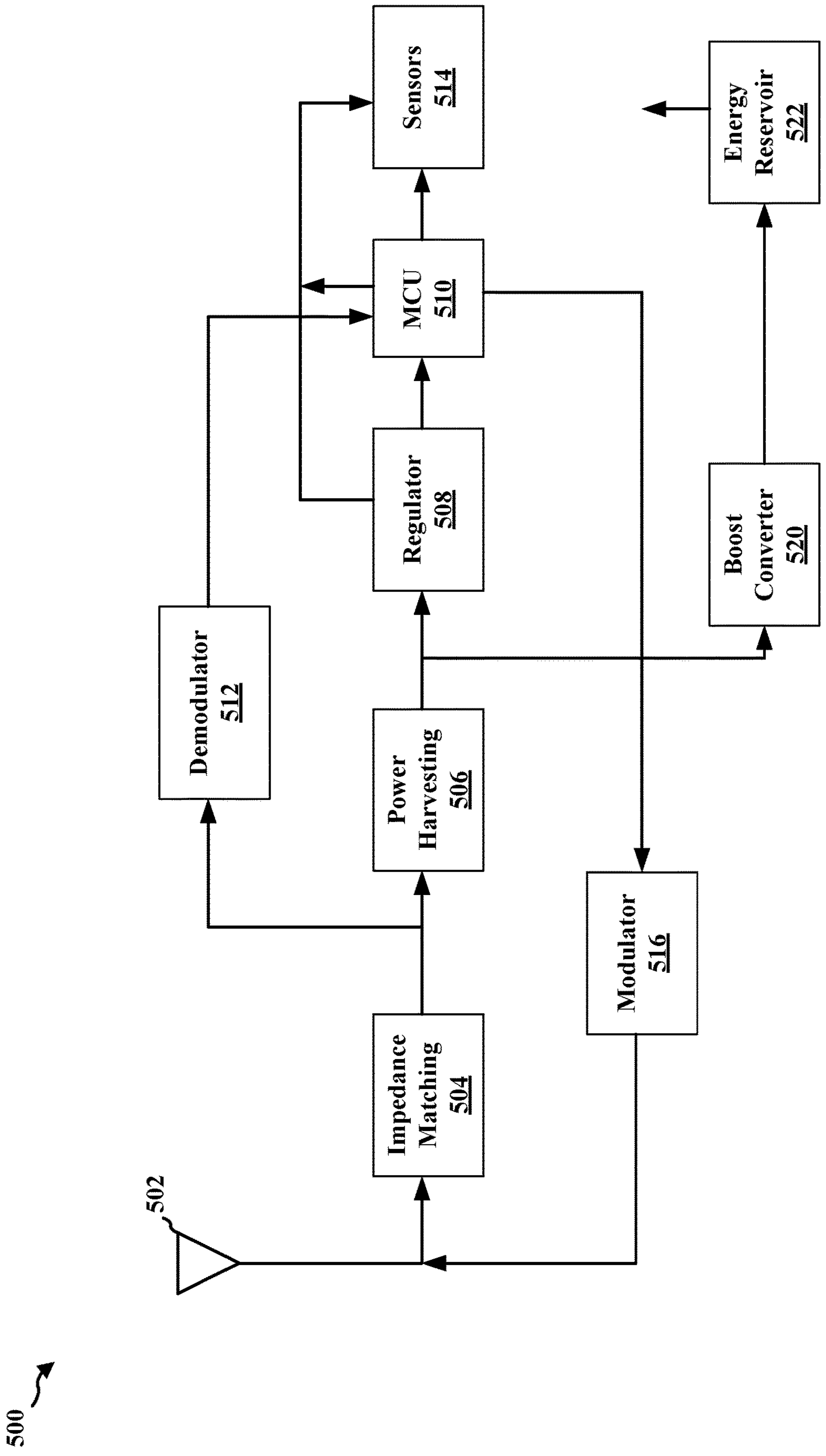
FIG. 5 is a diagram of a power harvesting circuit.

FIG. 5 is a diagram of a power harvesting circuit 500. In examples, the power harvesting circuit may be included at an RFID tag and may include few or no active components. The power harvesting circuit may be configured to operate at low power during an energy transfer procedure for RF power harvesting. The energy transfer signal may be received by an antenna 502 and communicated to an impedance matching component 504. The impedance matching component 504 may be tuned to an impedance of the antenna 502, so that an input to a power harvesting component 506 may be based on an increased power from the impedance matching component. An output of the impedance matching component 504 may also be demodulated by a demodulator 512 and provided to a microcontroller unit (MCU) 510.

A non-linearity of the power harvesting component 506 may be generated at an output of the power harvesting component 506 based on characteristics of a diode associated with the power harvesting component 506. For instance, the power harvesting component 506 may include a diode that has to receive a minimum voltage/power from the antenna 502 and impedance matching component 504 in order to activate the diode. The minimum voltage/power that is input to the power harvesting component 506 to activate the diode may be larger than a power associated with an information signal. For example, the input power to the power harvesting component 506 may be larger than −20 dBm, although −10 dBm may be a minimum power to activate the diode/power harvesting component 506 in some cases. The power harvesting component 506 may be more efficient at lower frequencies at converting the energy transfer signal to power based on a capacitance and/or a resistance of the diode at the power harvesting component 506. In contrast to energy transfer signals, bits of an information signal may be decoded at power inputs as low as −100 dBm to −80 dBm.

A regulator 508 may receive an output of the power harvesting component 506. The regulator 508 may regulate the non-linearity of the power harvesting component 506 prior to providing the output of the power harvesting component 506 to the MCU 510. The MCU 510 may be configured to control sensors 514 in communication with the MCU 510 based on the harvested power and/or output a signal to a modulator 516 that modulates the output signal as feedback for antenna 502 and/or the impedance matching component 504.

The power harvesting circuit 500 may include a boost converter 520 to receive the output of the power harvesting component 506. The boost converter may step up (or boost) the voltage of the output of the power harvesting component. The output of the boost converter 520 with the boosted voltage may be supplied to an energy reservoir 522. The energy reservoir 522 may receive the boosted voltage and store the energy harvested by the power harvesting component 506. The energy reservoir 522 may provide the stored power to other components that may need to turn on without the output of the power harvesting component 506. For example, the power harvesting circuit may determine that the energy signal received from the energy transmitter fails to meet a threshold value. If the energy density of the receive energy signal is lower than a turn-on voltage, the energy receiver may use the power stored in the energy reservoir to transmit an indication to the energy transmitter that the energy signal received from the energy transmitter failed to meet the threshold value.

In some aspects, the passive IoT devices may be incorporated into the wireless networks, and ambient RF signal may not provide sufficient power density to send the energy signal having the power density greater than or equal to a threshold value to activate (or turn on) the power harvesting circuit. In one example, the power density of the ambient RF signals (e.g., digital television signal (DTV), global system for mobile communication (GSM), 3G, or WiFi) may be lower than 10 nW/cm$^2$. Here, the power level may vary over time and depends on the locations.

The wireless communication techniques may support WET and/or WIT to incorporate passive IoT devices into wireless networks. In some aspects, a dedicated frequency bands may be configured for wireless energy transmission to passive IoT applications. The frequency band associated with the WET may be reserved for at least one of the WET, the WIT, or the WET and WIT. The dedicated frequency band may provide the energy coverage for the pervasive, or perpetual wireless-powered IoT devices.

Figure 6:
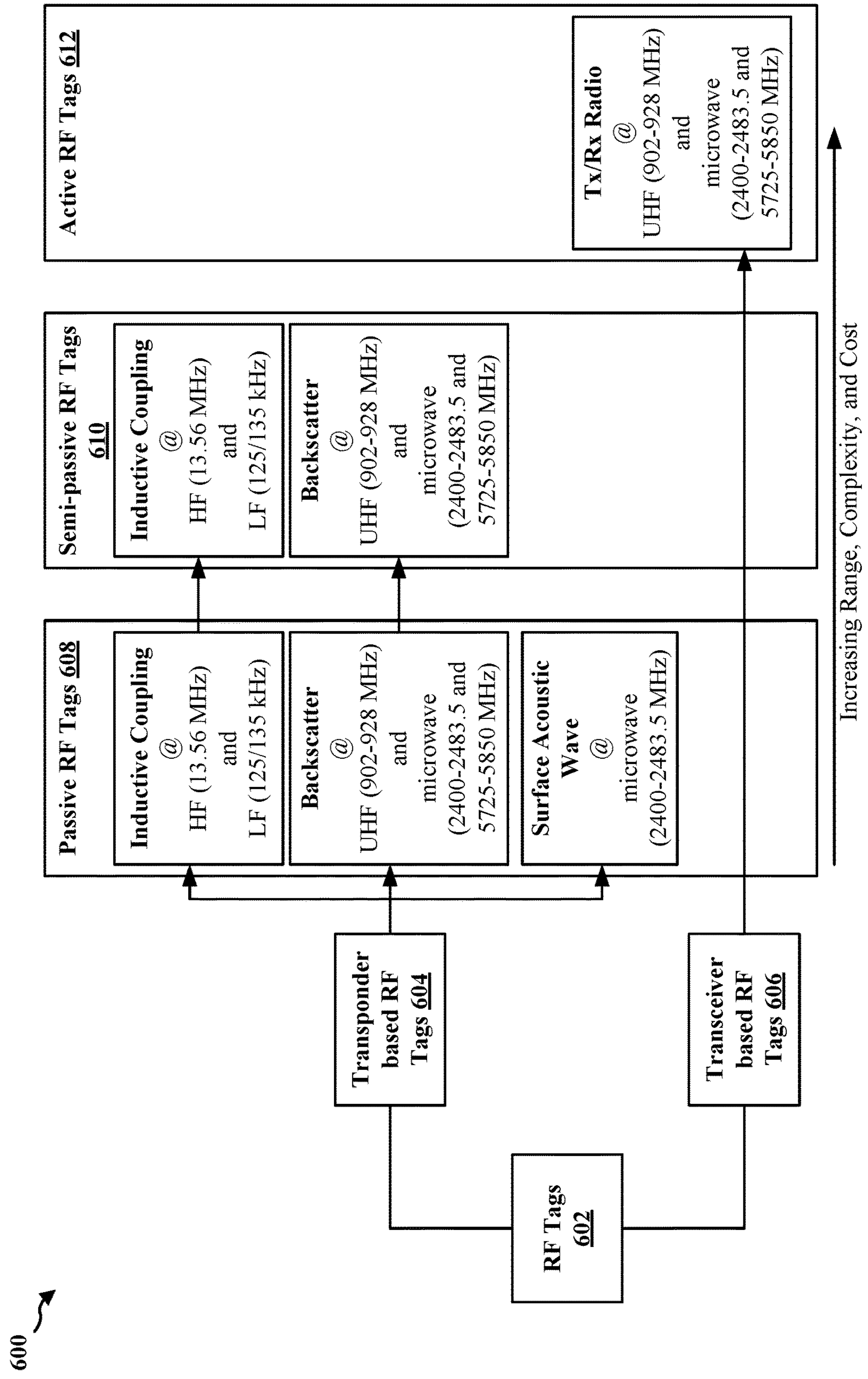
FIG. 6 is a diagram illustrating example aspects of RF tags.

FIG. 6 is a diagram 600 illustrating example aspects of RF tags 602. The RF tags 602 may be categorized into transponder based RF tags 604 and transceiver based RF tags 606. The transponder based RF tags 604 may include transponders. A transponder may refer to communication hardware that includes passive RF components (i.e., without consuming power for transmitting a communication signal); however, power may be consumed for controlling the communication hardware for transmitting different types of signals. In an example, a transponder may be a back-scatter based transponder in which power is consumed for controlling transmission of zero bits and one bits while actual transmission does not consume power. The transceiver based RF tags 606 may include transceivers. A transceiver may refer to communication hardware that includes active RF components that consume power for transmitting communication signals. The transponder based RF tags 604 may include passive RF tags 608 and semi-passive RF tags 610. The passive RF tags 608 may include RF tags that include an integrated circuit (IC), an antenna, and a transponder. The passive RF tags 608 may not include a battery. The passive RF tags 608 may be powered by inductive coupling, backscatter radio, and/or a surface acoustic wave. Inductive coupling may refer to a scenario in which a transmitter and a receiver are coupled through a magnetic field, where a transmitter generated magnetic field flows into the receiver. The transmitter and the receiver may be sensitive to distance and orientation. In an example, a RF tag that is powered by inductive coupling may communicate at a high frequency (HF) range of around 13.56 MHz and at a low frequency (LF) range of 125 or 135 kHz. Backscatter radio may refer to a communication device that may be controlled to reflect/backscatter signals with different amplitude, phase, and frequency. In an example, an RF tag that is powered by backscatter radio may communicate at an ultra-high frequency (UHF) of around 902-928 MHz and at microwave frequencies, such as 2400-2483.5 MHz and 5725-5850 MHz. A device powered by surface acoustic wave may convert an electric magnetic wave into an acoustic wave which propagates in a surface. In an example, an RF tag that is powered by a surface acoustic wave may communicate at a microwave frequency, such as 2400-2483.5 MHZ.

The semi-passive RF tags 610 may include RF tags that include an IC, an antenna, and energy storage (e.g., a batteries, rechargeable batteries, super capacitors, etc.). The battery may increase communications reliability and may increase a sensitivity of power harvesting circuitry while increasing costs. The semi-passive RF tags 610 may be powered by inductive coupling and/or backscatter radio (described above). The semi-passive RF tags 610 may store energy/power obtained via the inductive coupling and/or the backscatter radio in the energy storage.

The transceiver based RF tags 606 may include active RF tags 612. The active RF tags 612 may include RF tags that include an integrated circuit, an antenna, a battery, and an on-board transmitter. The battery may increase communications reliability and may increase a sensitivity of power harvesting circuitry while increasing costs. In an example, the on-board transmitter may be a transceiver. The active RF tags 612 may communicate via a Tx/Rx radio at UHFs (e.g., 902-928 MHz) and/or at microwave frequencies (e.g., 2400-2483.5 and 5725-5850 MHZ).

In general, the passive RF tags 608 may be associated with a lower range, a lower complexity, and a lower cost compared to the semi-passive RF tags 610. In general, the semi-passive RF tags 610 may be associated with a lower range, a lower complexity, and a lower cost compared to the active RF tags 612.

Figure 7:
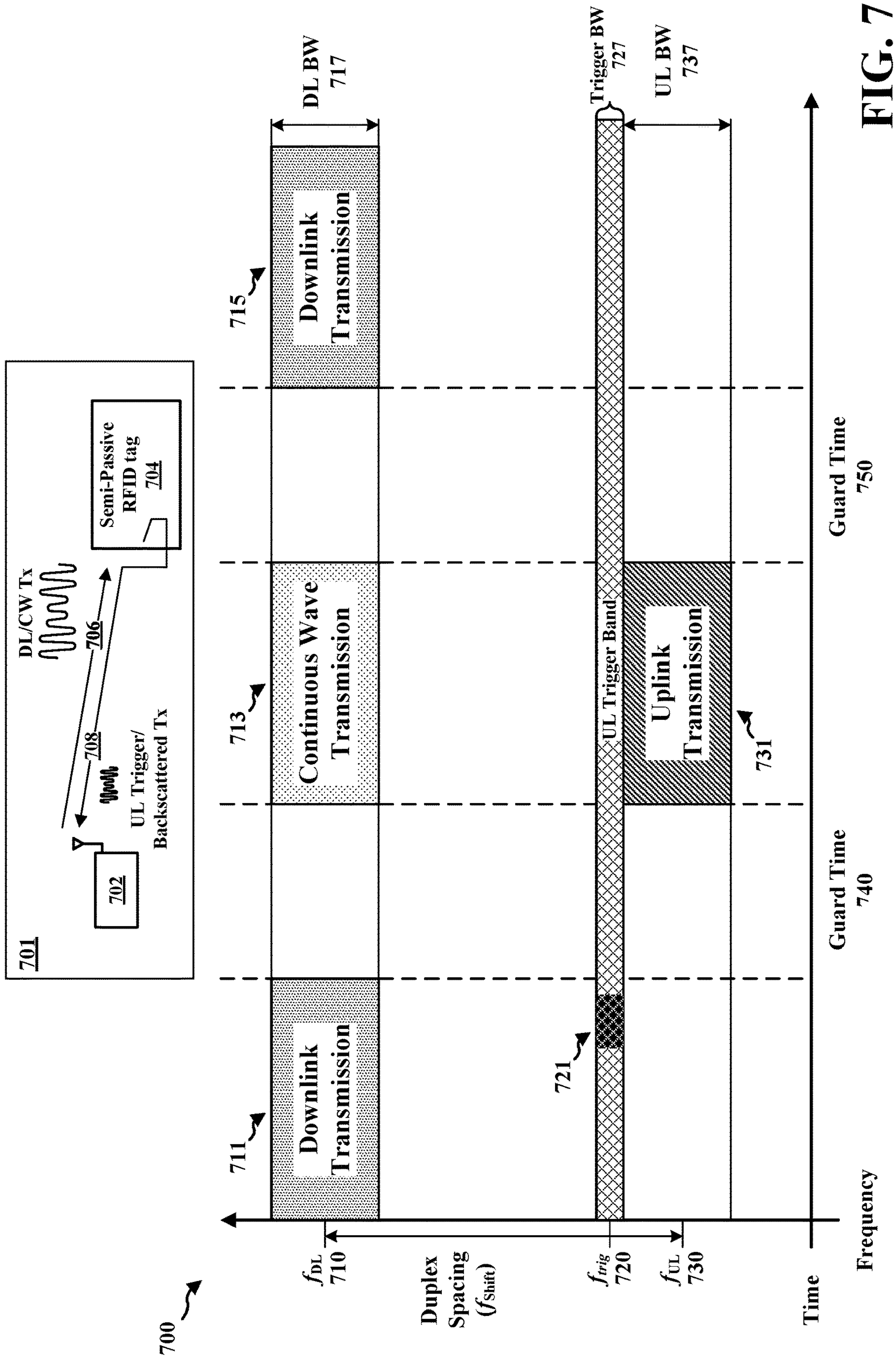
FIG. 7 is a diagram 70 illustrating a resource allocation associated with FDD operation of an IoT device in accordance with some aspects of the disclosure.

FIG. 7 is a diagram 700 illustrating a resource allocation associated with FDD operation of an IoT device in accordance with some aspects of the disclosure. A diagram 701 illustrates a network environment that, in some aspects, may be associated with the resource allocation illustrated in diagram 700. Diagram 700, illustrates a base station and/or reader 702 in communication with a semi-passive RFID tag 704 (e.g., as an example of an IoT wireless device that includes components capable of backscattering a received (CW) transmission and transmitting at least an UL trigger). As illustrated in diagram 701, the base station and/or reader 702 may transmit a DL or CW transmission 706 that may correspond to one or more of the DL transmission 711, the CW transmission 713, and/or the DL transmission 715. Additionally, the semi-passive RFID tag 704 may transmit, or backscatter, one or more of an UL trigger or backscattered transmission 708 that may correspond to the UL trigger 721 and the UL transmission 731.

The resource allocation illustrated in diagram 700 includes a first frequency bandwidth for (data, CW, and/or energy) transmissions from the base station and/or reader 702 (e.g., a DL BW 717) centered around a DL frequency (e.g., $f_{DL}$ 710). The resource allocation, in some aspects, may further include a second frequency bandwidth for UL communication from the semi-passive RFID tag 704 (e.g., an UL BW 737) centered around an UL frequency (e.g., $f_{UL}$ 730). In some aspects, the frequency difference between the $f_{DL}$ 710 and the $f_{UL}$ 730, e.g., a duplex spacing, may be associated with a frequency shift (e.g., by $f_{shift}$) introduced by the semi-passive RFID tag 704. In some aspects, different semi-passive RFID tags may be associated with different frequency shifts that may shift the $f_{DL}$ 710 into one of a set of candidate sub-bands, e.g., a set of candidate UL BWs including different distinct UL BWs and/or different partially-overlapping UL BWs, of a composite band including multiple UL BWs that may each be associated with different semi-passive RFID tags. In some aspects, the resource allocation may further include a third bandwidth for transmitting an UL trigger from the semi-passive RFID tag 704 (e.g., a trigger BW 727) centered around a trigger frequency (e.g., $f_{trig}$ 720). In some aspects, the third bandwidth (e.g., the trigger BW 727) may be a portion of the second bandwidth (e.g., the UL BW 737).

In some aspects, the base station and/or reader 702 may transmit DL transmission 711 during a first time period. While the base station and/or reader 702 transmits the DL transmission 711, it may monitor for an UL trigger from one or more RFID tags, such as the UL trigger 721 from the semi-passive RFID tag 704, indicating that the one or more RFID tags have information to transmit (or provide) to the base station and/or reader 702. In some aspects, the UL trigger 721 may be an active transmission (e.g., a transmission that does not rely on backscattering an incident, or ambient, signal). The UL trigger 721, in some aspects, may be an asynchronous signal, or operation (e.g., a signal not based on a previous synchronization).

In some aspects, the UL trigger 721 may be a low-power signal, where the low-power signal may be associated with at least one of a reduced modulation and coding scheme (MCS) index (e.g., a value less than or equal to 9, 4, or 14 for a first, second, and third MCS table, respectively, indicating a QPSK), a number of bits (e.g., n-bits, where n may take values between 1 and 50, between 10 and 40, or between 20 and 30, in different aspects and/or implementations) below a bit threshold (where the bit threshold may be used to define a low-power signal that the semi-passive RFID tag 704 is capable of transmitting), or a transmission power below a power threshold (e.g., a reduced and/or minimized transmission power associated with transmitting the number of bits with QPSK modulation). For example, the bit threshold may be related to a number of bits used to indicate that the semi-passive RFID tag 704 has information to provide and/or transmit, and to indicate additional characteristics about the information to provide and/or transmit. The additional characteristics, in some aspects, may include one or more of a latency, a time-sensitivity, or a priority associated with the information to provide and/or transmit. In some aspects, the additional characteristics may include a size of the information, or an amount of information, to provide and/or transmit. The additional characteristics, in some aspects, may be based on a limited set of known, or configured, candidate values (e.g., using a small number of bits, such as one to three bits, for indicating each characteristic) to reduce the power or overhead associated with transmitting the UL trigger 721.

Upon receiving the UL trigger 721, the base station and/or reader 702 may initiate a transition from a DL transmission 711 to a CW transmission 713. In some aspects, the transition may from the DL transmission 711 to a CW transmission 713 may include a guard time 740 (e.g., a time between the DL transmission 711 to a CW transmission 713 during which the base station and/or reader 702 omits a DL transmission). The timing of the transition, e.g., a time offset between receiving the UL trigger 721 and beginning the guard time 740 and/or the CW transmission 713, in some aspects, may be based on the additional characteristics indicated in the UL trigger 721 (e.g., the latency, the time-sensitivity, or the priority associated with the information). Similarly, the duration of the CW transmission 713, in some aspects, may be based on a known, or configured, time and/or amount of information associated with an UL transmission 731 or may be based on the indication, in the UL trigger 721, of the size of the information, or the amount of information, to provide and/or transmit in an associated UL transmission, such as UL transmission 731.

After the guard time 740, the base station and/or reader 702 may begin transmission of the CW transmission 713 and the semi-passive RFID tag 704 may backscatter the CW transmission 713 to generate the UL transmission 731 with the information to provide and/or transmit encoded during the backscattering operation. The frequency shift introduced by the semi-passive RFID tag 704 may allow the base station and/or reader 702 to simultaneously transmit the CW transmission 713 and to receive and decode the information encoded in the UL transmission 731. Additionally, by using an active RF component using stored energy to transmit the UL trigger 721 and a backscattering component using (or reflecting) the energy from the CW transmission to generate the UL transmission 731, the semi-passive RFID tag 704 may operate with a reduced energy consumption compared to using the active RF component to transmit the information included in the UL transmission 731. After the UL transmission 731, an additional guard time 750 may be introduced to separate the UL transmission 731 from a subsequent DL transmission 715. In some aspects, the base station and/or reader 702 may begin monitoring for additional and/or subsequent UL triggers from the semi-passive RFID tag 704 or other semi-passive RFID tags during the guard time 750 or may be continuously monitoring for a UL trigger.

Figure 8:
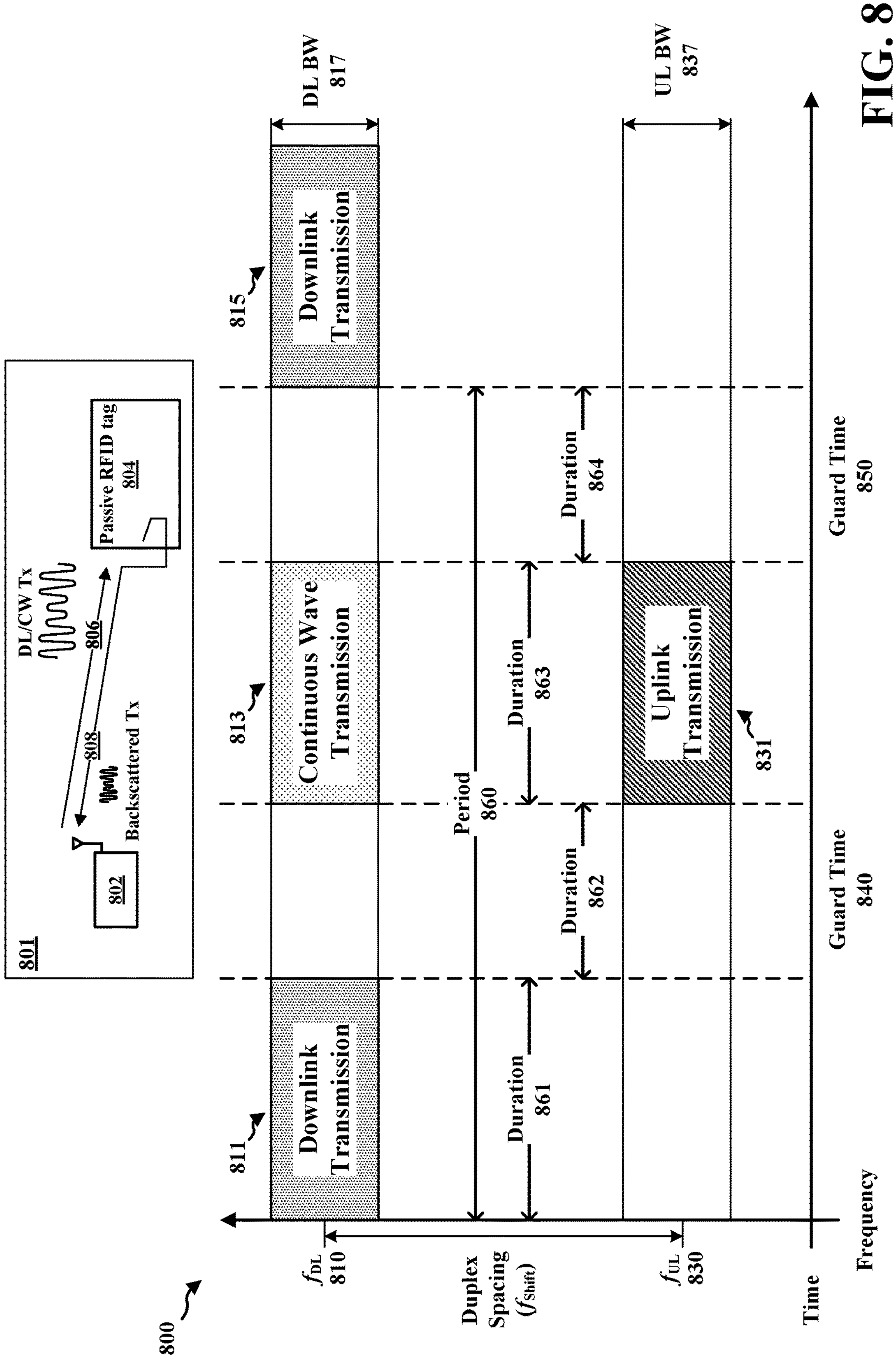
FIG. 8 is a diagram illustrating a resource allocation associated with FDD operation of an IoT device in accordance with some aspects of the disclosure.

FIG. 8 is a diagram 800 illustrating a resource allocation associated with FDD operation of an IoT device in accordance with some aspects of the disclosure. A diagram 801 illustrates a network environment that, in some aspects, may be associated with the resource allocation illustrated in diagram 800. Diagram 800, illustrates a base station and/or reader 802 in communication with a passive RFID tag 804 (e.g., as an example of an IoT wireless device that includes components capable of backscattering a received (CW) transmission and may not include, or may not be configured to use components for independently transmitting at least an UL trigger). As illustrated in diagram 801, the base station and/or reader 802 may transmit a DL or CW transmission 806 that may correspond to one or more of the DL transmission 811, the CW transmission 813, and/or the DL transmission 815. Additionally, the passive RFID tag 804 may backscatter a backscattered transmission 808 that may correspond to the UL transmission 831.

The resource allocation illustrated in diagram 800 includes a first frequency bandwidth for (data, CW, and/or energy) transmissions from the base station and/or reader 802 (e.g., a DL BW 817) centered around a DL frequency (e.g., $f_{DL}$ 810). The resource allocation, in some aspects, may further include a second frequency bandwidth for UL communication from the passive RFID tag 804 (e.g., an UL BW 837) centered around an UL frequency (e.g., $f_{UL}$ 830). In some aspects, the frequency difference between the $f_{DL}$ 810 and the $f_{UL}$ 830, e.g., a duplex spacing, may be associated with a frequency shift (e.g., by $f_{shift}$) introduced by the passive RFID tag 804. In some aspects, different passive RFID tags may be associated with different frequency shifts that may shift the $f_{DL}$ 810 into one of a set of candidate sub-bands, e.g., a set of candidate UL BWs including different distinct UL BWs and/or different partially-overlapping UL BWs, of a composite band including multiple UL BWs that may each be associated with different passive RFID tags.

For passive IoT devices (or IoT devices configured to use passive components and not active components for providing information to a reader device) such as passive RFID tag 804, the base station and/or reader 802 and the passive RFID tag 804 may be configured to provide and/or utilize periodic UL resources (e.g., periodic CW transmissions such as CW transmission 813). In some aspects, the periodicity of the UL transmission opportunities may be based on a minimum latency or a time-sensitivity of information to be reported by one or more passive RFID tags. For example, in some aspects, the base station and/or reader 802 may transmit the DL transmission 811 during a first known, or configured, time period (of duration 861), refrain from transmitting a DL or CW transmission during a second known, or configured, time period (e.g., the guard time 840 of duration 862) between a DL transmission and an UL transmission opportunity (associated with a CW transmission), and may transmit the CW transmission 813 during a third known, or configured, time period (of duration 863) associated with an UL transmission opportunity (e.g., with UL transmission 831 backscattered during the UL transmission opportunity and/or the third time period). Accordingly, while the base station and/or reader 802 transmits the CW transmission 813, it may monitor for an associated UL transmission 831 from one or more RFID tags, such as the UL transmission 831 from the passive RFID tag 804, including (e.g., encoded with) information. After the CW transmission 813 and/or the UL transmission 831, an additional guard time 850 (of duration 864) that may be a last period of time in a set of time periods making up a repeated unit repeated with a periodicity equal to period 860.

Figure 9:
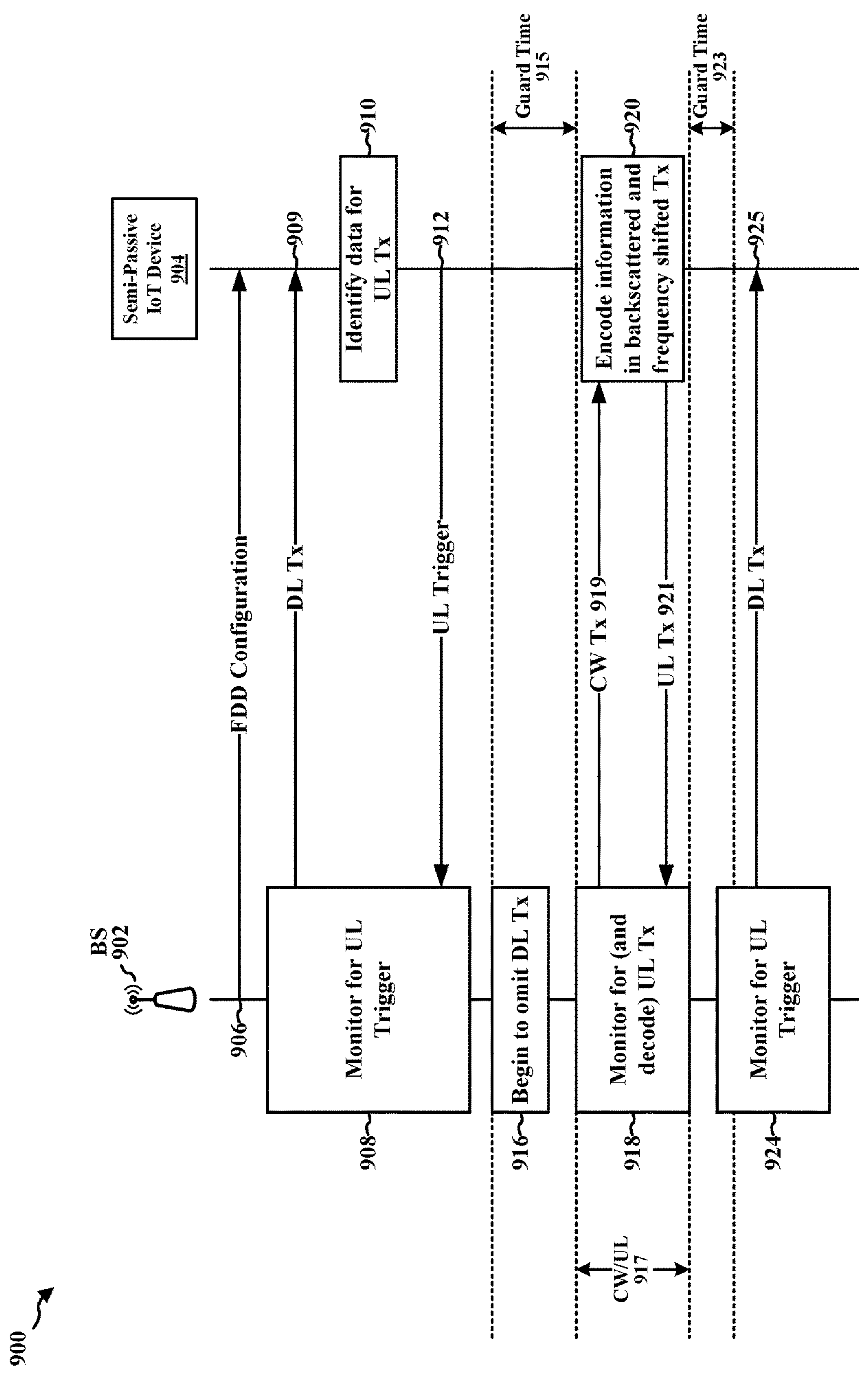
FIG. 9 is a call flow diagram illustrating a method of wireless communication associated with FDD operation of an IoT device in accordance with some aspects of the disclosure.

FIG. 9 is a call flow diagram 900 illustrating a method of wireless communication associated with FDD operation of an IoT device in accordance with some aspects of the disclosure. Call flow diagram 900, illustrates a base station 902 (e.g., as an example of a reader device that may be incorporated in a network device or network node that may include one or more components of a disaggregated base station) in communication with a semi-passive IoT device 904 (e.g., as an example of an IoT wireless device that includes components capable of backscattering a received (CW) transmission and transmitting at least an UL trigger). The functions ascribed to the base station 902, in some aspects, may be performed by one or more components of a reader device, a network entity, a network node, or a network device (a single network entity/node/device or a disaggregated network entity/node/device as described above in relation to FIG. 1). Similarly, the functions ascribed to the semi-passive IoT device 904, in some aspects, may be performed by one or more components of a wireless device supporting communication with a network entity/node/device. Accordingly, references to "transmitting" in the description below may be understood to refer to a first component of the base station 902 (or the semi-passive IoT device 904) outputting (or providing) an indication of the content of the transmission to be transmitted by a different component of the base station 902 (or the semi-passive IoT device 904). Similarly, references to "receiving" in the description below may be understood to refer to a first component of the base station 902 (or the semi-passive IoT device 904) receiving a transmitted signal and outputting (or providing) the received signal (or information based on the received signal) to a different component of the base station 902 (or the semi-passive IoT device 904). The base station 902, in some aspects, may transmit, and the semi-passive IoT device 904 may receive, a FDD configuration 906 indicating the parameters associated with a FDD (mode of) operation. The parameters associated with the FDD operation, in some aspects, may include one or more of a first indication of a first frequency range associated with a DL transmission from the base station 902 to the semi-passive IoT device 904, a second indication of a second frequency range associated with an UL communication from the semi-passive IoT device 904 to the base station 902, a third indication of a third frequency range associated with an UL trigger from the semi-passive IoT device 904 to the base station 902, and/or a fourth indication of a time gap applied by the base station 902 between receiving the UL trigger and transmitting a CW transmission. For example, referring to FIG. 7, the base station 902 may transmit an indication of a DL frequency (e.g., $f_{DL}$ 710) and an associated BW (e.g., the DL BW 717), an UL frequency (e.g., $f_{UL}$ 730) and an associated BW (e.g., the UL BW 737), a trigger frequency (e.g., $f_{trig}$ 720) and an associated BW (e.g., the trigger BW 727), and/or timing information associated with the guard time 740 (e.g., a duration of the guard time 740 and/or a time offset between receiving a UL trigger and beginning a guard time 740 and/or the CW transmission 713. In some aspects, the second frequency range may be indicated based on a frequency shift (e.g., a $f_{shift}$) between the first frequency range and the second frequency range. The first indication, the second indication, the third indication, and/or the fourth indication, in some aspects, may be transmitted and/or received via one of a physical broadcast channel (PBCH) or downlink control information (DCI). In some aspects, the third indication (or an associated fifth indication) may indicate a set of periodic time resources for transmitting the UL trigger (e.g., UL trigger resources or UL trigger occasions, opportunities, and/or candidates), where a period associated with the set of periodic time resources may be based on a (maximum allowable) latency, or time-sensitivity, associated with the semi-passive IoT device 904 and/or a related UL transmission (e.g., an application, a type of sensor, or a type of information associated with the semi-passive IoT device 904 and/or the related UL transmission).

In some aspects, after transmitting the FDD configuration 906, the base station 902 may, at 908, begin monitoring the third frequency range (e.g., the trigger BW 727) for an UL trigger and may simultaneously transmit, and the semi-passive IoT device 904 may receive, one or more DL transmissions 909. After receiving the FDD configuration 906, the semi-passive IoT device 904 may, at 910, identify and/or determine that the semi-passive IoT device 904 has information to provide and/or transmit to the base station 902 (e.g., that the semi-passive IoT device 904 has data for an UL transmission). For example, the semi-passive IoT device 904, in some aspects, may be a sensor that has collected new sensor data (e.g., a threshold amount of new sensor data) or has detected a change in the sensor data (e.g., a change in a sensed condition or input). The identification and/or determination at 910, in some aspects, may include a series of determinations that the semi-passive IoT device 904 does not have information (e.g., does not have a threshold amount of information) to provide and/or transmit to the base station 902 before the identification that the semi-passive IoT device 904 has information to provide and/or transmit to the base station 902. Based on identification and/or determination at 910, the semi-passive IoT device 904 may transmit, and the base station 902 may receive, an UL trigger 912. In some aspects, the UL trigger 912 may be an active transmission (e.g., a transmission that does not rely on backscattering an incident, or ambient, signal) from an active component of the semi-passive IoT device 904. The UL trigger 912, in some aspects, may be an asynchronous signal, or operation (e.g., a signal not based on a previous synchronization).

In some aspects, the UL trigger 912 may be a low-power signal, where the low-power signal may be associated with at least one of a low, or reduced (compared to the backscattered transmission), MCS index, a number of bits below a bit threshold, or a transmission power below a power threshold. For example, the bit threshold may be related to a number of bits used to indicate that the semi-passive IoT device 904 has information to provide and/or transmit, and to indicate additional characteristics about the information to provide and/or transmit, where the number of bits is significantly smaller than the number of bits used to transmit the information identified and/or determined at 910. The additional characteristics, in some aspects, may include one or more of a latency, a time-sensitivity, or a priority associated with the information to provide and/or transmit. In some aspects, the additional characteristics may include a size of the information, or an amount of information, to provide and/or transmit. The additional characteristics, in some aspects, may be based on a limited set of known, or configured, candidate values (e.g., using a small number of bits, such as one to three bits, for indicating each characteristic) to reduce the power or overhead associated with transmitting the UL trigger 912.

Based on receiving the UL trigger 912, the base station 902 may, at 916, begin to omit, or refrain from transmitting, one or more DL transmissions during a guard time 915 (and may continue to omit, or refrain from transmitting, the DL transmissions during a time period associated with a CW transmission associated with receiving an UL transmission from the semi-passive IoT device 904). In some aspects, a time offset between receiving the UL trigger 912 and beginning the guard time 915 and/or the CW transmission 919 may be based on the additional characteristics indicated in the UL trigger 912 (e.g., the latency, the time-sensitivity, or the priority associated with the information). At 918, the base station 902 may begin to monitor for a UL transmission and begin to transmit a CW transmission 919. Although depicted as a single transmission, the CW transmission 919 may be a continuous transmission during a CW/UL transmission time 917. The CW/UL transmission time 917, in some aspects, may be of a known, or configured, duration that may be based on an amount of information (e.g., a maximum amount of information) expected for an UL transmission from a semi-passive IoT device associated with a particular application. Alternatively, or additionally, the CW/UL transmission time 917, in some aspects, may be dynamically determined and/or extended, e.g., based on a number of UL triggers received from different semi-passive IoT devices, based on receiving an additional UL trigger (e.g., from at least one additional semi-passive IoT device) during the CW/UL transmission time 917, and/or based on an amount of information to be transmitted in an UL transmission indicated in an associated UL trigger.

The semi-passive IoT device 904 may receive the CW transmission 919 and, in some aspects, may perform an encoding operation at 920 to encode the information identified and/or determined at 910 for transmission to the base station 902. The encoding operation at 920, in some aspects, may include encoding the information in a backscattered and frequency-shifted UL transmission 921. The encoding operation at 920, in some aspects, may be performed by a passive (e.g., backscatter-capable) component of the semi-passive IoT device 904. The UL transmission 921, in some aspects, may use a portion of the CW transmission 919. For example, the CW/UL transmission time 917 may be configured to allow for a maximum amount of information associated with a particular application where the amount of the information provided and/or transmitted via the UL transmission 921 is less than the maximum amount of information. Additionally, or alternatively, the UL trigger may include an indication of an amount of information from a set of candidate amounts of information such that the indicated amount is greater than the actual amount of information to be provided and/or transmitted (e.g., if a next smallest candidate amount of information is less than the actual amount of information to be provided and/or transmitted). In some aspects, the semi-passive IoT device 904 may additionally harvest energy from the CW transmission 919 or a portion of the CW transmission 919 (e.g., a portion of the CW transmission 919 not used, not backscattered, to transmit the UL transmission 921).

The frequency shift introduced by the semi-passive IoT device 904 may allow the base station 902 to simultaneously transmit the CW transmission 919 and to receive and decode the information encoded in the UL transmission 921. Additionally, by using an active RF component using stored energy to transmit the UL trigger 912 and a backscattering component using (or reflecting) the energy from the CW transmission 919 to generate the UL transmission 921, the semi-passive IoT device 904 may operate with a reduced energy consumption compared to using the active RF component to transmit the information included in the UL transmission 921. Additionally, using the UL trigger 912, the base station 902 and the semi-passive IoT device 904 may avoid a latency associated with performing a synchronization operation.

The base station 902, in some aspects, may receive the UL transmission 921 and decode the information at 918. After the end of the CW/UL transmission time 917, the base station may refrain from transmitting any transmissions during an additional guard time 923 between the CW transmission 919 and subsequent DL transmissions. In some aspects, after the beginning of the guard time 923, the base station 902 may begin to monitor for additional UL triggers at 924. Monitoring for the additional UL triggers at 924, in some aspects, may begin before the end of the guard time as it may be considered an extension of monitoring for the UL transmission 921 (e.g., if the trigger BW is a portion of the UL BW) or because it may be less sensitive to interference from the CW transmission 919 than a subsequent DL transmission (e.g., DL transmission 925). After the guard time 923, the base station 902 may transmit, and semi-passive IoT device 904 may receive, DL transmission 925.

FIG. 10 is a call flow diagram 1000 illustrating a method of wireless communication associated with FDD operation of an IoT device in accordance with some aspects of the disclosure. Call flow diagram 1000, illustrates a base station 1002 (e.g., as an example of a reader device that may be incorporated in a network device or network node that may include one or more components of a disaggregated base station) in communication with a passive IoT device 1004 (e.g., as an example of an IoT wireless device that includes components capable of backscattering a received (CW) transmission). The functions ascribed to the base station 1002, in some aspects, may be performed by one or more components of a reader device, a network entity, a network node, or a network device (a single network entity/node/device or a disaggregated network entity/node/device as described above in relation to FIG. 1). Similarly, the functions ascribed to the passive IoT device 1004, in some aspects, may be performed by one or more components of a wireless device supporting communication with a network entity/node/device. Accordingly, references to "transmitting" in the description below may be understood to refer to a first component of the base station 1002 (or the passive IoT device 1004) outputting (or providing) an indication of the content of the transmission to be transmitted by a different component of the base station 1002 (or the passive IoT device 1004). Similarly, references to "receiving" in the description below may be understood to refer to a first component of the base station 1002 (or the passive IoT device 1004) receiving a transmitted signal and outputting (or providing) the received signal (or information based on the received signal) to a different component of the base station 1002 (or the passive IoT device 1004).

The base station 1002, in some aspects, may transmit, and the passive IoT device (e.g., 1004) may receive, a FDD configuration indicating the parameters associated with a FDD (mode of) operation. The parameters associated with the FDD operation, in some aspects, may include one or more of a first indication of a first frequency range associated with a DL transmission from the base station 1002 to the passive IoT device 1004, a second indication of a second frequency range associated with an UL communication from the passive IoT device 1004 to the base station 1002, and/or a third indication of a set of time resources associated with a CW transmission from the base station 1002 via the first frequency range for backscattering by via the second frequency range to provide information from the passive backscatter device 1004 to the base station 1002. For example, referring to FIG. 8, the base station 1002 may transmit an indication of a DL frequency (e.g., $f_{DL}$ 810) and an associated BW (e.g., the DL BW 817), an UL frequency (e.g., $f_{UL}$ 830) and an associated BW (e.g., the UL BW 837), and/or timing information associated with the CW transmission 813. The timing information, in some aspects, may include information regarding the period 860, and any of the durations 861, 862, 863, and/or 864, associated with the DL transmission 811, the guard time 840, the CW transmission 813, and/or the guard time 850, respectively. In some aspects, the second frequency range may be indicated based on a frequency shift (e.g., a $f_{shift}$) between the first frequency range and the second frequency range. The first indication, the second indication, and/or the third indication, in some aspects, may be transmitted and/or received via one of a PBCH or DCI. In some aspects, the set of time resources associated with a CW transmission from the base station 1002 may be based on a (maximum allowable) latency, or time-sensitivity, associated with the passive IoT device 1004 and/or a related UL transmission (e.g., an application, a type of sensor, or a type of information associated with the passive IoT device 1004 and/or the related UL transmission). For example, a period of a repeating unit of transmission opportunities, e.g., the period 860 (or 1060), or a time between CW transmissions, e.g., the sum of durations 861, 862, and 864 (or of a DL transmission time 1011, a guard time 1013, and a guard time 1021), associated with the set of time resources (e.g., a CW/UL transmission time 1015) associated with a CW transmission may be configured to not exceed a time based on the (maximum allowable) latency and/or the time-sensitivity associated with the passive IoT device 1004 and/or a related UL transmission.

In some aspects, after transmitting the FDD configuration 1006, the base station 1002 and the passive IoT device 1004 may perform a synchronization operation associated with transmissions 1008. In some aspects, the synchronization operation associated with transmissions 1008 may be performed before receiving the FDD configuration 1006. Before a first repeating unit of time periods there may be a first guard time 1009 during which no transmissions are expected (or transmitted) by the base station 1002. During a first time period (e.g., a DL transmission time 1011) associated with one or more DL transmissions, the base station 1002 may transmit, and the passive IoT device 1004 may receive, DL transmission 1010. Additionally, or alternatively, the passive IoT device 1004 may, during the DL transmission time 1011, identify and/or determine, at 1012, that the passive IoT device 1004 has information to provide and/or transmit to the base station 1002 (e.g., that the passive IoT device 1004 has data for an UL transmission). For example, the passive IoT device 1004, in some aspects, may be a sensor that has collected new sensor data (e.g., a threshold amount of new sensor data) or has detected a change in the sensor data (e.g., a change in a sensed condition or input). As the UL transmission resources, occasions, and/or opportunities are periodic, the identification and/or determination at 1012 may be performed periodically at a time allowing the passive IoT device 1004 to make use of a next UL transmission resource, occasion, and/or opportunity.

Based on the parameters associated with the FDD operation indicated in the FDD configuration 1006, the base station 1002 may omit, or refrain from transmitting, a DL transmission and a CW transmission during the guard time 1013. After the guard time 1013, and during the CW/UL transmission time 1015, the base station 1002 may, at 1016, begin to monitor for a UL transmission and begin to transmit a CW transmission 1017. Although depicted as a single transmission, the CW transmission 1017 may be a continuous transmission during the CW/UL transmission time 1015. As discussed above, the CW/UL transmission time 1015, in some aspects, may be of a known, or configured, duration that may be based on an amount of information (e.g., a maximum amount of information) expected for an UL transmission from a passive IoT device associated with a particular application.

The passive IoT device 1004 may receive the CW transmission 1017 and, in some aspects, may perform an encoding operation at 1018 to encode the information identified and/or determined at 1012 for transmission to the base station 1002. The encoding operation at 1018, in some aspects, may include encoding the information in a backscattered and frequency-shifted UL transmission 1019. The encoding operation at 1018, in some aspects, may be performed by a passive (e.g., backscatter-capable) component of the passive IoT device 1004. The UL transmission 1019, in some aspects, may use a portion of the CW transmission 1017. For example, the duration of the CW/UL transmission time 1015 may be configured to allow for a maximum amount of information associated with a particular application where the amount of the information provided and/or transmitted via the UL transmission 1019 is less than the maximum amount of information. The base station 1002, in some aspects, may receive the UL transmission 1019 and decode the information at 1016. After the end of the CW/UL transmission time 1015, the base station may refrain from transmitting any transmissions during an additional guard time 1021 between the CW transmission 1017 and subsequent DL transmissions. After the guard time 1021, and during a subsequent time period (e.g., a DL transmission time 1023) associated with one or more DL transmissions, the base station 1002 may transmit, and passive IoT device 1004 may receive, DL transmission 1022. Additionally, or alternatively, the passive IoT device 1004 may, during the DL transmission time 1011, identify and/or determine, at 1024, that the passive IoT device 1004 does not have (e.g., lacks) information to provide and/or transmit to the base station 1002 (e.g., that the passive IoT device 1004 does not have data for an UL transmission). For example, the passive IoT device 1004, in some aspects, may determine at 1024 that it lacks a threshold amount of information or lacks information with a latency that will expire before a second subsequent UL transmission resource, occasion, or opportunity. For example, for a passive IoT device 1004 associated with a sensor, the passive IoT device 1004 may determine at 1024 that no new sensor data has been collected (e.g., or an amount of new sensor data below a threshold amount of new sensor data for reporting) or has detected no change in the sensor data. As the UL transmission resources, occasions, and/or opportunities are periodic, the identification and/or determination at 1024 may be one of a series of identifications and/or determinations performed periodically at a time allowing the passive IoT device 1004 to make use of a next UL transmission resource, occasion, and/or opportunity as discussed above.

Based on the parameters associated with the FDD operation indicated in the FDD configuration 1006, the base station 1002 may omit, or refrain from transmitting, a DL transmission and a CW transmission during the guard time 1025. After the guard time 1025, and during the CW/UL transmission time 1027, the base station 1002 may, at 1028, begin to monitor for a UL transmission and begin to transmit a CW transmission 1029. Although depicted as a single transmission, the CW transmission 1029 may be a continuous transmission during the CW/UL transmission time 1027. The passive IoT device 1004 may receive the CW transmission 1029 and, in some aspects, may, omit an encoding operation at 1030 based on the determination at 1024 that the passive IoT device 1004 does not have information to provide and/or transmit to the base station 1002.

Figure 11:
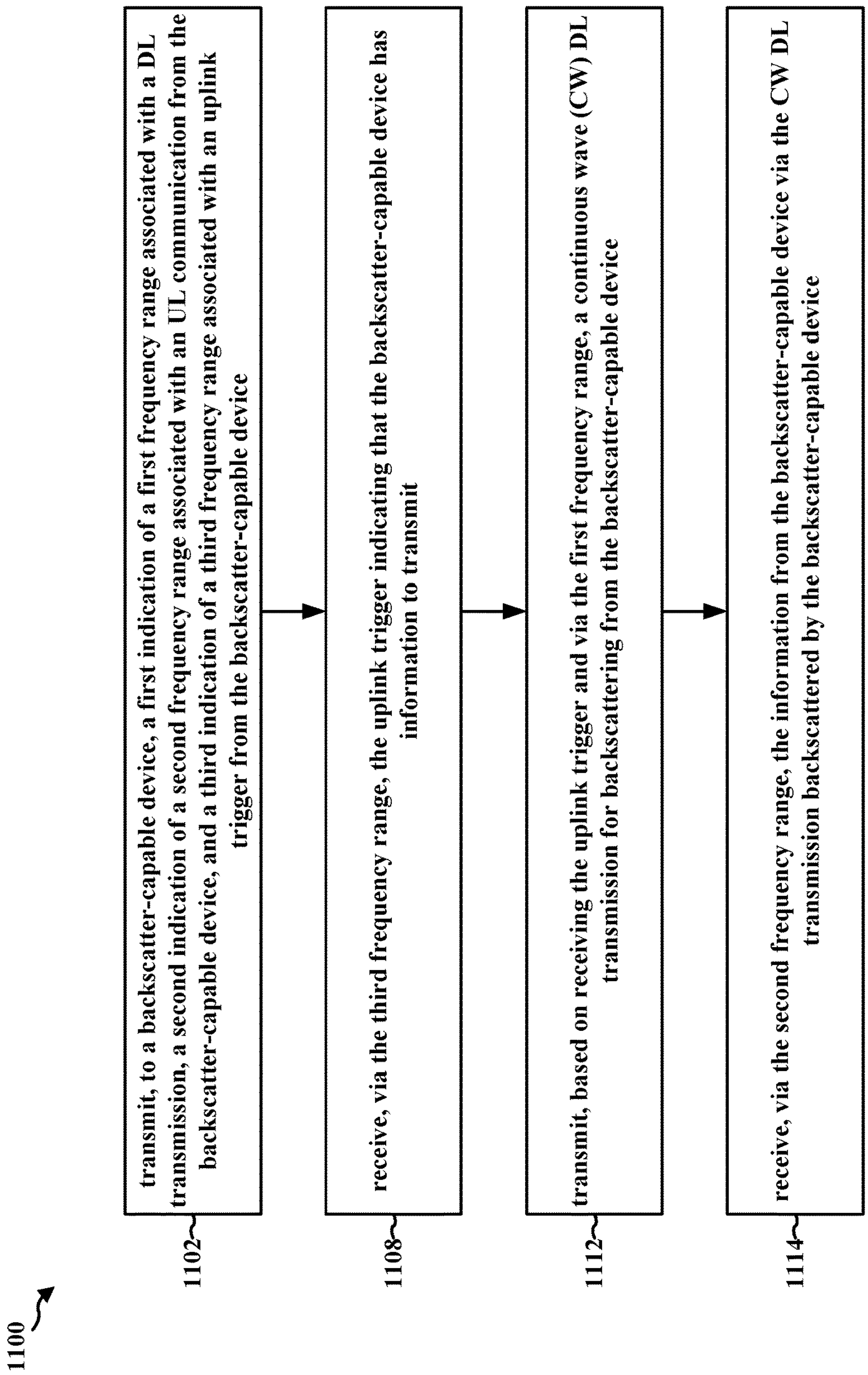
FIG. 11 is a flowchart of a method of wireless communication.

FIG. 11 is a flowchart 1100 of a method of wireless communication. The method may be performed by a base station, e.g., a network device or a network node that may serve as a reader device for an IoT application (e.g., the base station 102, 902, 1002; the RFID reader 402; the base station and/or reader 702, 802; the network entity 1902, 2002). At 1102, the base station may transmit, to a backscatter-capable device, a first indication of a first frequency range associated with a DL transmission, a second indication of a second frequency range associated with an UL communication from the backscatter-capable device, and a third indication of a third frequency range associated with an UL trigger from the backscatter-capable device. For example, 1102 may be performed by CU processor(s) 2012, DU processor(s) 2032, RU processor(s) 2042, transceiver(s) 2046, antenna(s) 2080, and/or AIoTFDD component 199 of FIG. 20. In some aspects, the backscatter-capable device may be an IoT device such as a semi-passive IoT device (e.g., an RFID tag. RFIC, etc.) or a wireless device having at least a set of passive components capable of backscattering an impinging, or CW, transmission and a set of active components capable of transmitting an UL trigger (e.g., a low-power, or low-information, transmission). In some aspects, at least one of the second indication or the third indication may include an indication of a frequency offset from the first frequency range. One or more of the first indication, the second indication, or the third indication may be transmitted via one of a PBCH or DCI. In some aspects, the third indication may include an indication of a set of periodic time resources for transmitting the UL trigger (e.g., a set of UL trigger resources, occasions, and/or opportunities). A period associated with the set of periodic time resources, in some aspects, may be based on a latency associated with the backscatter-capable device. For example, a period associated with the set of periodic time resources may be based on a (maximum allowable) latency, or time-sensitivity, associated with the backscatter-capable device and/or a related UL transmission (e.g., an application, a type of sensor, or a type of information associated with the backscatter-capable device and/or the related UL transmission). For example, referring to FIGS. 7 and 9, the base station and/or reader 702 or the base station 902 may transmit the FDD configuration 906.

In some aspects, the base station may transmit, to the backscatter-capable device, a fourth indication of a time gap applied by the network device between receiving the UL trigger and transmitting the CW DL transmission. In some aspects, the time gap may be associated with a time gap, or guard time, between a DL transmission and a CW DL transmission as well as a time associated with processing the UL trigger and a time-offset until an end of the DL transmission. For example, referring to FIGS. 7 and 9, the base station and/or reader 702 or the base station 902 may transmit the FDD configuration 906 including the fourth indication of the time gap applied by the base station 902 between receiving the UL trigger and transmitting a CW transmission.

The base station, in some aspects, may monitor the third frequency range for the UL trigger. In some aspects, monitoring the third frequency range at 1106 may include one of continuously monitoring the third frequency range or monitoring a set of UL trigger resources in the third frequency range indicated in the third indication (e.g., an indicated set of UL trigger resources, occasions, and/or opportunities). For example, referring to FIGS. 7 and 9, the base station and/or reader 702 or the base station 902 may, at 908, begin monitoring the third frequency range (e.g., the trigger BW 727) for an UL trigger.

At 1108, the base station may receive, via the third frequency range, the UL trigger indicating that the backscatter-capable device has information to transmit. For example, 1108 may be performed by transceiver(s) 2046, antenna(s) 2080, and/or AIoTFDD component 199 of FIG. 20. In some aspects, the UL trigger is associated with a low-power signal. The low-power signal, in some aspects, may be associated with at least one of a reduced MCS index (e.g., an MCS index associated with an MCS or coding rate that is lower than an MCS index associated with an associated UL transmission), a number of bits below a bit threshold, or a transmission power below a power threshold. In some aspects, the UL trigger may indicate one of a time-sensitivity of the information (e.g., a remaining time before the information becomes irrelevant or expires) or a priority of the information. For example, referring to FIGS. 7 and 9, the base station and/or reader 702 or the base station 902 may, at 908, monitor for and receive, an UL trigger 912 (or UL trigger 721).

In some aspects, the base station may omit, based on one of the time-sensitivity of the information or the priority of the information, a non-CW DL transmission via the first frequency range in order to transmit the CW DL transmission. In some aspects, omitting the non-CW DL transmission at 1110 may include omitting, or refraining from transmitting, a non-CW DL transmission during the time gap indicated in the fourth indication. For example, referring to FIGS. 7 and 9, the base station and/or reader 702 or the base station 902 may, at 916, begin to omit, or refrain from transmitting, one or more DL transmissions during a guard time 915, or guard time 740, and may continue to omit, or refrain from transmitting, the DL transmissions during a time period (e.g., the CW/UL transmission time 917) associated with a CW transmission, e.g., CW transmission 919, associated with receiving an UL transmission, e.g., UL transmission 921, from the semi-passive IoT device 904.

At 1112, the base station may transmit, based on receiving the UL trigger and via the first frequency range, a CW DL transmission for backscattering from the backscatter-capable device. For example, 1112 may be performed by CU processor(s) 2012, DU processor(s) 2032. RU processor(s) 2042, transceiver(s) 2046, antenna(s) 2080, and/or AIoTFDD component 199 of FIG. 20. In some aspects, transmitting the CW DL transmission at 1112 may include transmitting the CW DL for a continuous period known, or configured, to be sufficient to receive information via a backscattered UL signal. For example, referring to FIGS. 7 and 9, the base station and/or reader 702 or the base station 902 may transmit CW transmission 919 to the semi-passive IoT device 904.

At 1114, the base station may receive, via the second frequency range, the information from the backscatter-capable device via the CW DL transmission backscattered by the backscatter-capable device. For example, 1114 may be performed by CU processor(s) 2012, DU processor(s) 2032, RU processor(s) 2042, transceiver(s) 2046, antenna(s) 2080, and/or AIoTFDD component 199 of FIG. 20. In some aspects, the CW DL transmission backscattered by the backscatter-capable device may be an UL transmission with the information encoded by the backscattering operation (e.g., a modulation introduced by the backscattering) and receiving the information at 1114 includes decoding the received CW DL transmission backscattered by the backscatter-capable device. For example, referring to FIGS. 7 and 9, the base station and/or reader 702 or the base station 902 may receive (and decode) the UL transmission 921 from the semi-passive IoT device 904 including the information.

Figure 12:
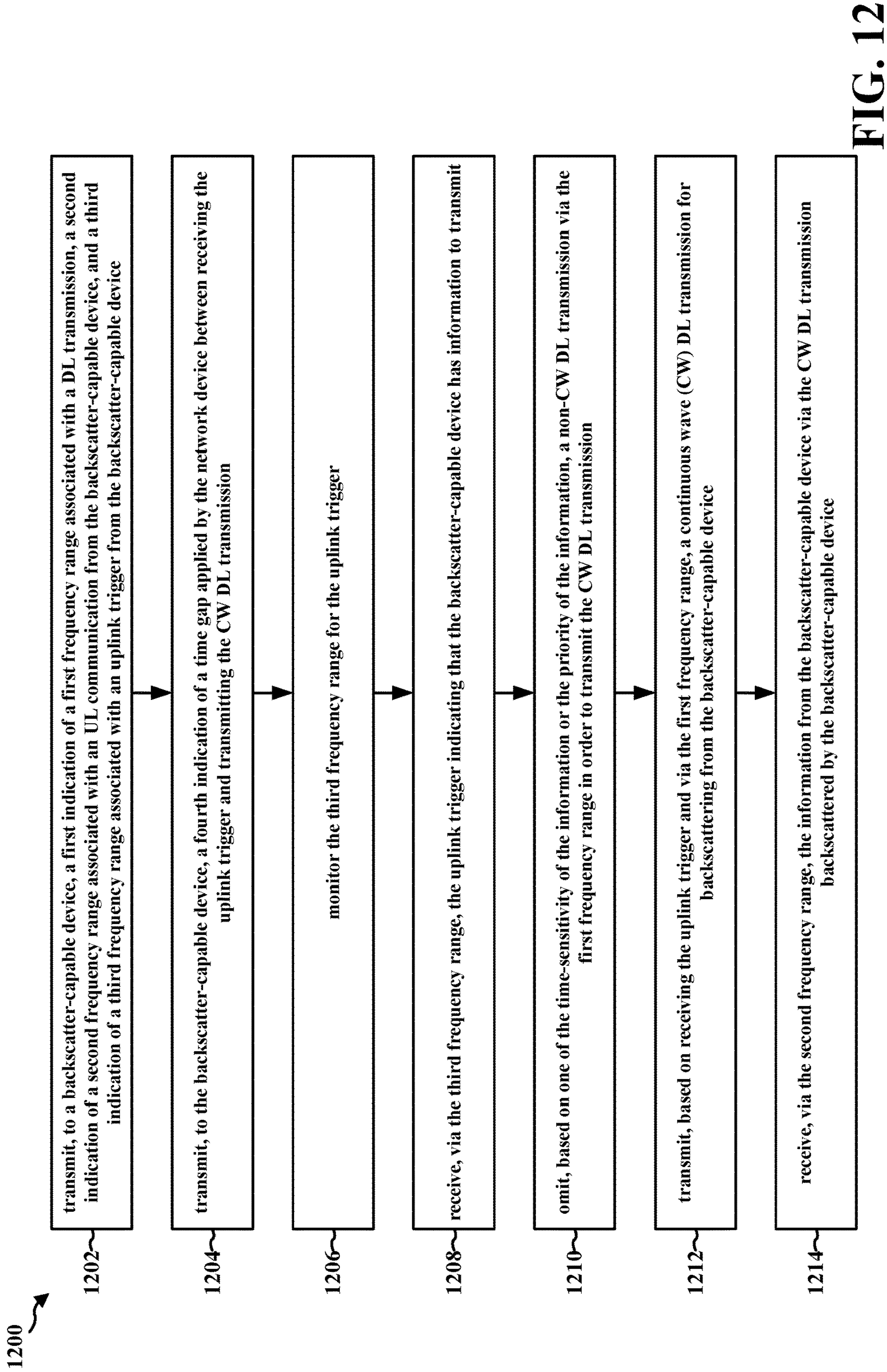
FIG. 12 is a flowchart of a method of wireless communication.

FIG. 12 is a flowchart 1200 of a method of wireless communication. The method may be performed by a base station, e.g., a network device or a network node that may serve as a reader device for an IoT application (e.g., the base station 102, 902, 1002; the RFID reader 402; the base station and/or reader 702, 802; the network entity 1902, 2002). At 1202, the base station may transmit, to a backscatter-capable device, a first indication of a first frequency range associated with a DL transmission, a second indication of a second frequency range associated with an UL communication from the backscatter-capable device, and a third indication of a third frequency range associated with an UL trigger from the backscatter-capable device. For example, 1202 may be performed by CU processor(s) 2012, DU processor(s) 2032, RU processor(s) 2042, transceiver(s) 2046, antenna(s) 2080, and/or AIoTFDD component 199 of FIG. 20. In some aspects, the backscatter-capable device may be an IoT device such as a semi-passive IoT device (e.g., an RFID tag, RFIC, etc.) or a wireless device having at least a set of passive components capable of backscattering an impinging, or CW, transmission and a set of active components capable of transmitting an UL trigger (e.g., a low-power, or low-information, transmission). In some aspects, at least one of the second indication or the third indication may include an indication of a frequency offset from the first frequency range. One or more of the first indication, the second indication, or the third indication may be transmitted via one of a PBCH or DCI. In some aspects, the third indication may include an indication of a set of periodic time resources for transmitting the UL trigger (e.g., a set of UL trigger resources, occasions, and/or opportunities). A period associated with the set of periodic time resources, in some aspects, may be based on a latency associated with the backscatter-capable device. For example, a period associated with the set of periodic time resources may be based on a (maximum allowable) latency, or time-sensitivity, associated with the backscatter-capable device and/or a related UL transmission (e.g., an application, a type of sensor, or a type of information associated with the backscatter-capable device and/or the related UL transmission). For example, referring to FIGS. 7 and 9, the base station and/or reader 702 or the base station 902 may transmit the FDD configuration 906.

At 1204, the base station may transmit, to the backscatter-capable device, a fourth indication of a time gap applied by the network device between receiving the UL trigger and transmitting the CW DL transmission. For example, 1204 may be performed by CU processor(s) 2012, DU processor(s) 2032, RU processor(s) 2042, transceiver(s) 2046, antenna(s) 2080, and/or AIoTFDD component 199 of FIG. 20. In some aspects, the time gap may be associated with a time gap, or guard time, between a DL transmission and a CW DL transmission as well as a time associated with processing the UL trigger and a time-offset until an end of the DL transmission. For example, referring to FIGS. 7 and 9, the base station and/or reader 702 or the base station 902 may transmit the FDD configuration 906 including the fourth indication of the time gap applied by the base station 902 between receiving the UL trigger and transmitting a CW transmission.

At 1206, the base station may monitor the third frequency range for the UL trigger. For example, 1206 may be performed by CU processor(s) 2012, DU processor(s) 2032, RU processor(s) 2042, transceiver(s) 2046, antenna(s) 2080, and/or AIoTFDD component 199 of FIG. 20. In some aspects, monitoring the third frequency range at 1206 may include one of continuously monitoring the third frequency range or monitoring a set of UL trigger resources in the third frequency range indicated in the third indication (e.g., an indicated set of UL trigger resources, occasions, and/or opportunities). For example, referring to FIGS. 7 and 9, the base station and/or reader 702 or the base station 902 may, at 908, begin monitoring the third frequency range (e.g., the trigger BW 727) for an UL trigger.

At 1208, the base station may receive, via the third frequency range, the UL trigger indicating that the backscatter-capable device has information to transmit. For example, 1208 may be performed by transceiver(s) 2046, antenna(s) 2080, and/or AIoTFDD component 199 of FIG. 20. In some aspects, the UL trigger is associated with a low-power signal. The low-power signal, in some aspects, may be associated with at least one of a reduced MCS index (e.g., an MCS index associated with an MCS or coding rate that is lower than an MCS index associated with an associated UL transmission), a number of bits below a bit threshold, or a transmission power below a power threshold. In some aspects, the UL trigger may indicate one of a time-sensitivity of the information (e.g., a remaining time before the information becomes irrelevant or expires) or a priority of the information. For example, referring to FIGS. 7 and 9, the base station and/or reader 702 or the base station 902 may, at 908, monitor for and receive, an UL trigger 912 (or UL trigger 721).

At 1210, the base station may omit, based on one of the time-sensitivity of the information or the priority of the information, a non-CW DL transmission via the first frequency range in order to transmit the CW DL transmission. For example, 1210 may be performed by CU processor(s) 2012, DU processor(s) 2032, RU processor(s) 2042, transceiver(s) 2046, antenna(s) 2080, and/or AIoTFDD component 199 of FIG. 20. In some aspects, omitting the non-CW DL transmission at 1210 may include omitting, or refraining from transmitting, a non-CW DL transmission during the time gap indicated in the fourth indication. For example, referring to FIGS. 7 and 9, the base station and/or reader 702 or the base station 902 may, at 916, begin to omit, or refrain from transmitting, one or more DL transmissions during a guard time 915, or guard time 740, and may continue to omit, or refrain from transmitting, the DL transmissions during a time period (e.g., the CW/UL transmission time 917) associated with a CW transmission, e.g., CW transmission 919, associated with receiving an UL transmission, e.g., UL transmission 921, from the semi-passive IoT device 904.

At 1212, the base station may transmit, based on receiving the UL trigger and via the first frequency range, a CW DL transmission for backscattering from the backscatter-capable device. For example, 1212 may be performed by CU processor(s) 2012, DU processor(s) 2032, RU processor(s) 2042, transceiver(s) 2046, antenna(s) 2080, and/or AIoTFDD component 199 of FIG. 20. In some aspects, transmitting the CW DL transmission at 1212 may include transmitting the CW DL for a continuous period known, or configured, to be sufficient to receive information via a backscattered UL signal. For example, referring to FIGS. 7 and 9, the base station and/or reader 702 or the base station 902 may transmit CW transmission 919 to the semi-passive IoT device 904.

At 1214, the base station may receive, via the second frequency range, the information from the backscatter-capable device via the CW DL transmission backscattered by the backscatter-capable device. For example, 1214 may be performed by CU processor(s) 2012, DU processor(s) 2032, RU processor(s) 2042, transceiver(s) 2046, antenna(s) 2080, and/or AIoTFDD component 199 of FIG. 20. In some aspects, the CW DL transmission backscattered by the backscatter-capable device may be an UL transmission with the information encoded by the backscattering operation (e.g., a modulation introduced by the backscattering) and receiving the information at 1214 includes decoding the received CW DL transmission backscattered by the backscatter-capable device. For example, referring to FIGS. 7 and 9, the base station and/or reader 702 or the base station 902 may receive (and decode) the UL transmission 921 from the semi-passive IoT device 904 including the information.

Figure 13:
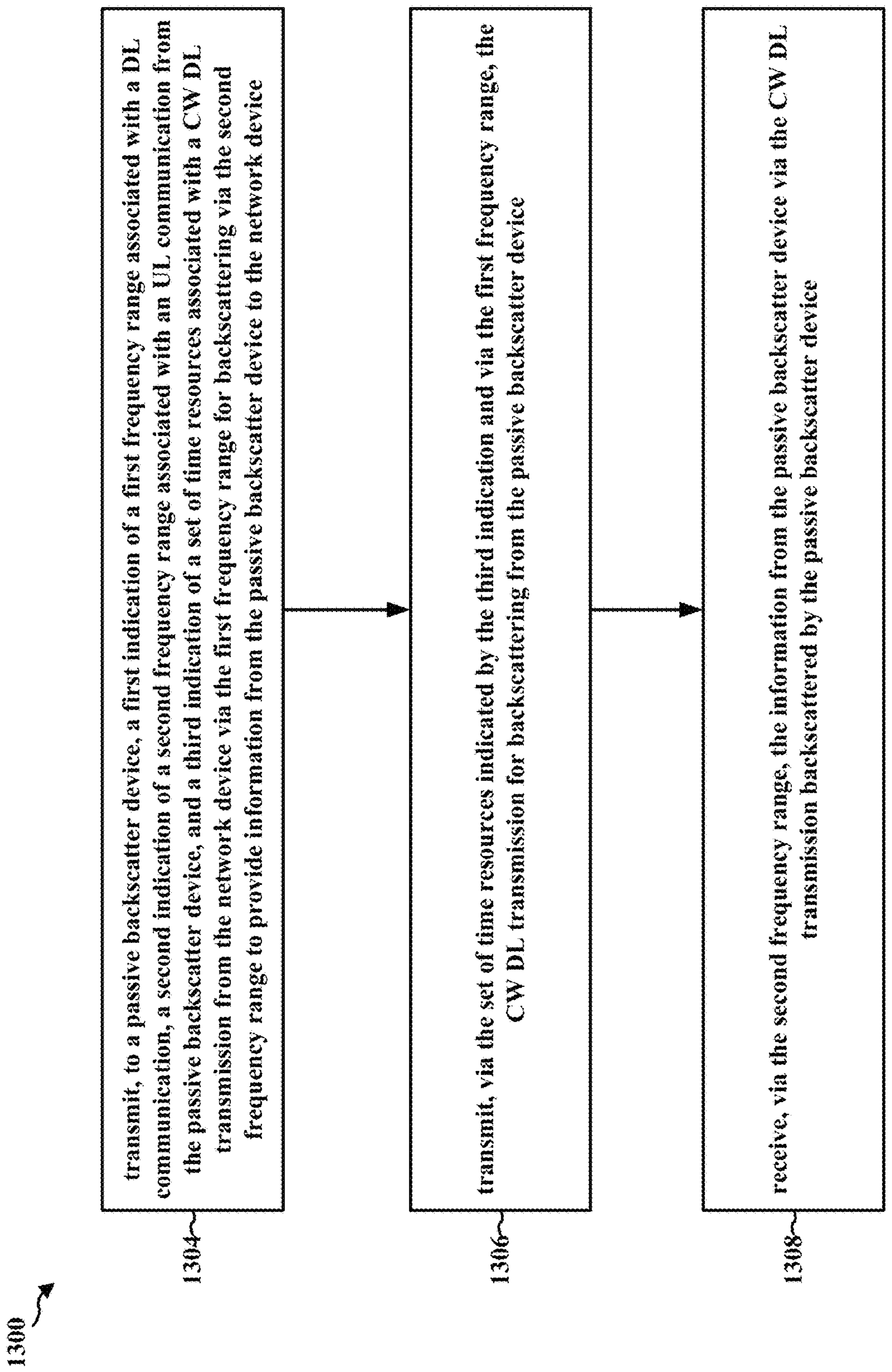
FIG. 13 is a flowchart of a method of wireless communication.

FIG. 13 is a flowchart 1300 of a method of wireless communication. The method may be performed by a base station, e.g., a network device or a network node that may serve as a reader device for an IoT application (e.g., the base station 102, 902, 1002; the RFID reader 402; the base station and/or reader 702, 802; the network entity 1902, 2002). In some aspects, the base station may perform a synchronization operation with a passive backscatter device. In some aspects, the synchronization operation may be used to define and/or identify resources associated with different aspects of the FDD operation of the base station and the passive backscatter device. For example, referring to FIGS. 8 and 10, the base station and/or reader 802 or the base station 1002 may perform a synchronization operation associated with the transmissions 1008.

At 1304, the base station may transmit, to a passive backscatter device, a first indication of a first frequency range associated with a DL communication, a second indication of a second frequency range associated with an UL communication from the passive backscatter device, and a third indication of a set of time resources associated with a CW DL transmission from the base station via the first frequency range for backscattering via the second frequency range to provide information from the passive backscatter device to the base station. For example, 1304 may be performed by CU processor(s) 2012, DU processor(s) 2032, RU processor(s) 2042, transceiver(s) 2046, antenna(s) 2080, and/or AIoTFDD component 199 of FIG. 20. In some aspects, the passive backscatter device may be an IoT device such as a passive IoT device (e.g., an RFID tag, RFIC, etc.) or a wireless device having at least a set of passive components capable of backscattering an impinging, or CW, transmission. In some aspects, at least one of the second indication or the third indication may include an indication of a frequency offset from the first frequency range. One or more of the first indication, the second indication, and/or the third indication may be transmitted via one of a PBCH or DCI. In some aspects, the third indication may include a reference time, a duration, and a period associated with transmitting the CW DL transmission from the base station. A period associated with the set of periodic time resources, in some aspects, may be based on a latency associated with the passive backscatter device. For example, a period associated with the set of periodic time resources may be based on a (maximum allowable) latency, or time-sensitivity, associated with the passive backscatter device and/or a related UL transmission (e.g., an application, a type of sensor, or a type of information associated with the passive backscatter device and/or the related UL transmission). In some aspects, the synchronization operation may occur after transmitting at least one of the first indication, the second indication, and/or the third indication, where the set of time resources associated with the third indication may be identified based on the synchronization operation between the base station and the passive backscatter device. For example, referring to FIGS. 8 and 10, the base station and/or reader 802 or the base station 1002 may transmit the FDD configuration 1006.

At 1306, the base station may transmit, via the set of time resources indicated by the third indication and via the first frequency range, the CW DL transmission for backscattering from the passive backscatter device. For example, 1306 may be performed by CU processor(s) 2012, DU processor(s) 2032, RU processor(s) 2042, transceiver(s) 2046, antenna(s) 2080, and/or AIoTFDD component 199 of FIG. 20. In some aspects, the base station may simultaneously monitor for a backscattered UL transmission associated with, or based on, the CW DL transmission. For example, referring to FIGS. 8 and 10, the base station and/or reader 802 or the base station 1002 may transmit the CW transmission 813, 1017, or 1029 and monitor for the UL transmission at 1016 or 1028.

At 1308, the base station may receive, via the second frequency range, the information from the passive backscatter device via the CW DL transmission backscattered by the passive backscatter device. For example, 1308 may be performed by CU processor(s) 2012, DU processor(s) 2032, RU processor(s) 2042, transceiver(s) 2046, antenna(s) 2080, and/or AIoTFDD component 199 of FIG. 20. In some aspects, the CW DL transmission backscattered by the passive backscatter device may be an UL transmission with the information encoded by the backscattering operation (e.g., a modulation introduced by the backscattering) and receiving the information at 1308 includes decoding the received CW DL transmission backscattered by the passive backscatter device. For example, referring to FIGS. 8 and 10, the base station and/or reader 802 or the base station 1002 may receive the UL transmission 831 or 1019 based on the CW transmission 813 or 1017 while monitoring for the UL transmission at 1016.

In some aspects, the base station may transmit a fourth indication of an updated set of time resources associated with the CW DL transmission from the base station. In some aspects, the updated set of time resources may include an updated period associated with transmitting the CW DL transmission from the base station. The fourth indication, in some aspects, may be transmitted via one of a PBCH or DCI. In some aspects, the fourth indication may include an update to one or more of the reference time, the duration, and/or the period associated with transmitting the CW DL transmission from the base station. The fourth indication, in some aspects, may be based on the information received at 1308. For example, referring to FIGS. 8 and 10, the base station and/or reader 802 or the base station 1002 may transmit the FDD configuration 1006 (e.g., after a previous process similar to the process illustrated in FIG. 10).

Figure 14:
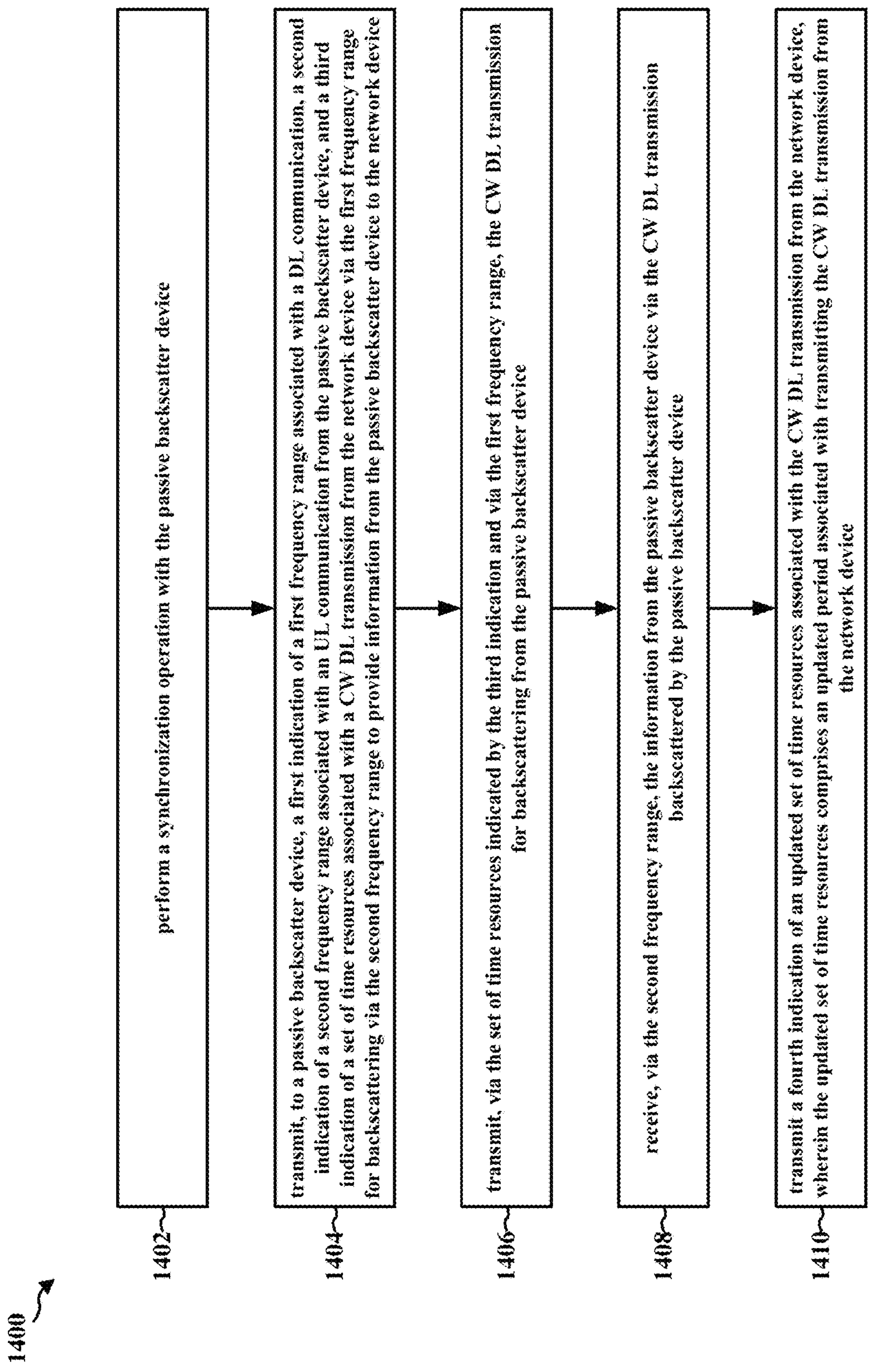
FIG. 14 is a flowchart of a method of wireless communication.

FIG. 14 is a flowchart 1400 of a method of wireless communication. The method may be performed by a base station, e.g., a network device or a network node that may serve as a reader device for an IoT application (e.g., the base station 102, 902, 1002; the RFID reader 402; the base station and/or reader 702, 802; the network entity 1902, 2002). At 1402, the base station may perform a synchronization operation with a passive backscatter device. For example, 1402 may be performed by CU processor(s) 2012. DU processor(s) 2032, RU processor(s) 2042, transceiver(s) 2046, antenna(s) 2080, and/or AIoTFDD component 199 of FIG. 20. In some aspects, the synchronization operation at 1402 may be used to define and/or identify resources associated with different aspects of the FDD operation of the base station and the passive backscatter device. For example, referring to FIGS. 8 and 10, the base station and/or reader 802 or the base station 1002 may perform a synchronization operation associated with the transmissions 1008.

At 1404, the base station may transmit, to a passive backscatter device, a first indication of a first frequency range associated with a DL communication, a second indication of a second frequency range associated with an UL communication from the passive backscatter device, and a third indication of a set of time resources associated with a CW DL transmission from the base station via the first frequency range for backscattering via the second frequency range to provide information from the passive backscatter device to the base station. For example, 1404 may be performed by CU processor(s) 2012, DU processor(s) 2032, RU processor(s) 2042, transceiver(s) 2046, antenna(s) 2080, and/or AIoTFDD component 199 of FIG. 20. In some aspects, the passive backscatter device may be an IoT device such as a passive IoT device (e.g., an RFID tag, RFIC, etc.) or a wireless device having at least a set of passive components capable of backscattering an impinging, or CW, transmission. In some aspects, at least one of the second indication or the third indication may include an indication of a frequency offset from the first frequency range. One or more of the first indication, the second indication, and/or the third indication may be transmitted via one of a PBCH or DCI. In some aspects, the third indication may include a reference time, a duration, and a period associated with transmitting the CW DL transmission from the base station. A period associated with the set of periodic time resources, in some aspects, may be based on a latency associated with the passive backscatter device. For example, a period associated with the set of periodic time resources may be based on a (maximum allowable) latency, or time-sensitivity, associated with the passive backscatter device and/or a related UL transmission (e.g., an application, a type of sensor, or a type of information associated with the passive backscatter device and/or the related UL transmission). In some aspects, the synchronization operation at 1402 may occur after transmitting at least one of the first indication, the second indication, and/or the third indication, where the set of time resources associated with the third indication may be identified based on the synchronization operation between the base station and the passive backscatter device. For example, referring to FIGS. 8 and 10, the base station and/or reader 802 or the base station 1002 may transmit the FDD configuration 1006.

At 1406, the base station may transmit, via the set of time resources indicated by the third indication and via the first frequency range, the CW DL transmission for backscattering from the passive backscatter device. For example, 1406 may be performed by CU processor(s) 2012, DU processor(s) 2032, RU processor(s) 2042, transceiver(s) 2046, antenna(s) 2080, and/or AIoTFDD component 199 of FIG. 20. In some aspects, the base station may simultaneously monitor for a backscattered UL transmission associated with, or based on, the CW DL transmission. For example, referring to FIGS. 8 and 10, the base station and/or reader 802 or the base station 1002 may transmit the CW transmission 813, 1017, or 1029 and monitor for the UL transmission at 1016 or 1028.

At 1408, the base station may receive, via the second frequency range, the information from the passive backscatter device via the CW DL transmission backscattered by the passive backscatter device. For example, 1408 may be performed by CU processor(s) 2012, DU processor(s) 2032, RU processor(s) 2042, transceiver(s) 2046, antenna(s) 2080, and/or AIoTFDD component 199 of FIG. 20. In some aspects, the CW DL transmission backscattered by the passive backscatter device may be an UL transmission with the information encoded by the backscattering operation (e.g., a modulation introduced by the backscattering) and receiving the information at 1408 includes decoding the received CW DL transmission backscattered by the passive backscatter device. For example, referring to FIGS. 8 and 10, the base station and/or reader 802 or the base station 1002 may receive the UL transmission 831 or 1019 based on the CW transmission 813 or 1017 while monitoring for the UL transmission at 1016.

At 1410, the base station may transmit a fourth indication of an updated set of time resources associated with the CW DL transmission from the base station. For example, 1410 may be performed by CU processor(s) 2012, DU processor(s) 2032, RU processor(s) 2042, transceiver(s) 2046, antenna(s) 2080, and/or AIoTFDD component 199 of FIG. 20. In some aspects, the updated set of time resources may include an updated period associated with transmitting the CW DL transmission from the base station. The fourth indication, in some aspects, may be transmitted via one of a PBCH or DCI. In some aspects, the fourth indication may include an update to one or more of the reference time, the duration, and/or the period associated with transmitting the CW DL transmission from the base station. The fourth indication, in some aspects, may be based on the information received at 1408. For example, referring to FIGS. 8 and 10, the base station and/or reader 802 or the base station 1002 may transmit the FDD configuration 1006 (e.g., after a previous process similar to the process illustrated in FIG. 10).

Figure 15:
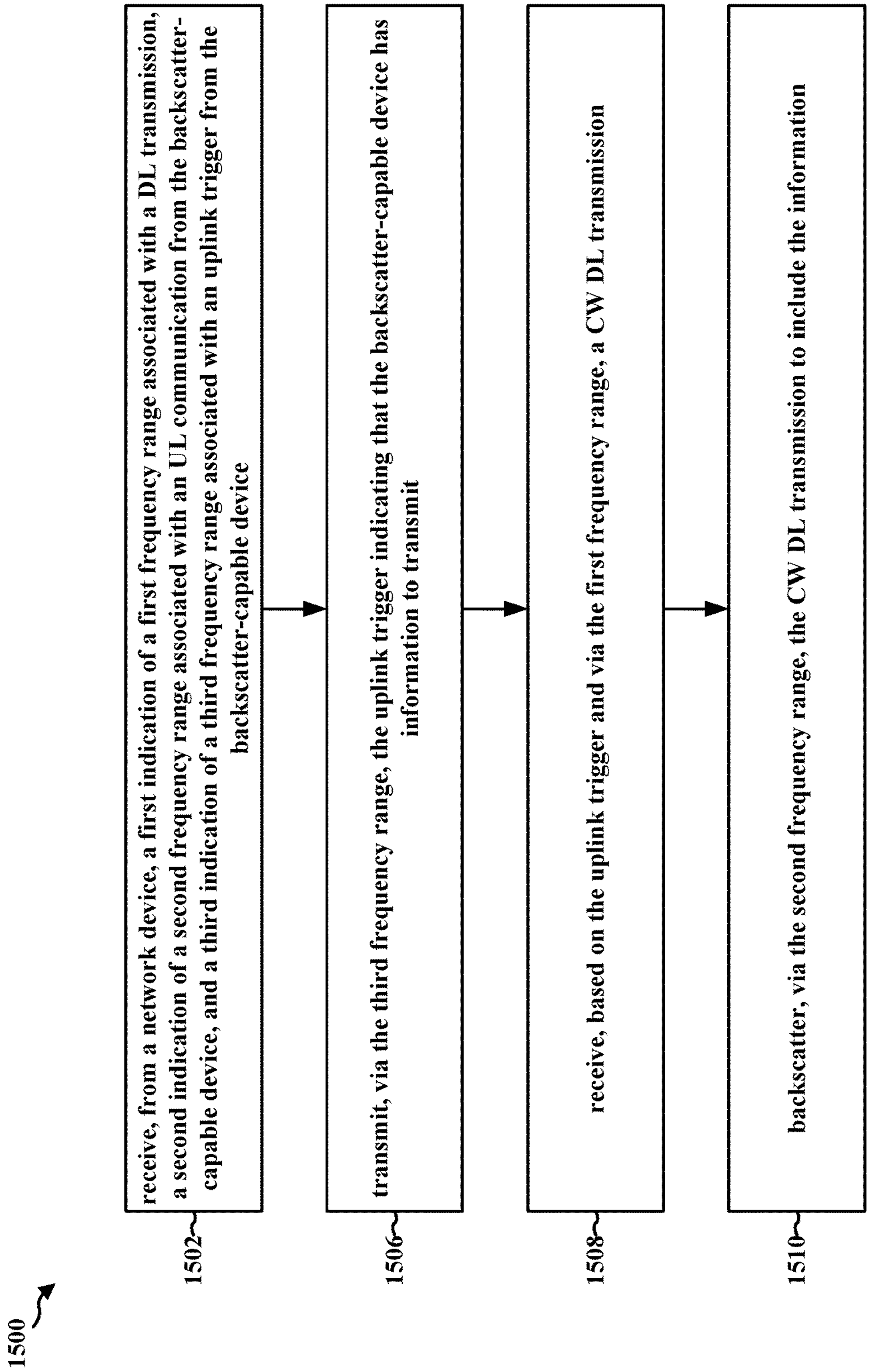
FIG. 15 is a flowchart of a method of wireless communication.

FIG. 15 is a flowchart 1500 of a method of wireless communication. The method may be performed by a backscatter-capable device, e.g., an IoT device such as a semi-passive IoT device (e.g., an RFID tag, RFIC, etc.) or a wireless device (or UE) having at least a set of passive components capable of backscattering an impinging, or CW, transmission and a set of active components capable of transmitting an UL trigger (e.g., a low-power, or low-information, transmission) (e.g., the UE 104; the semi-passive RFID tag 704; the semi-passive IoT device 904; the apparatus 1904, 2104). At 1502, the backscatter-capable device may receive, from a network device, a first indication of a first frequency range associated with a DL transmission, a second indication of a second frequency range associated with an UL communication from the backscatter-capable device, and a third indication of a third frequency range associated with an UL trigger from the backscatter-capable device. For example, 1502 may be performed by baseband processor(s) 2124, antenna(s) 2180, and/or AIoTFDD component 198 of FIG. 21. In some aspects, at least one of the second indication or the third indication may include an indication of a frequency offset from the first frequency range. One or more of the first indication, the second indication, or the third indication may be transmitted via one of a PBCH or DCI. In some aspects, the third indication may include an indication of a set of periodic time resources for transmitting the UL trigger (e.g., a set of UL trigger resources, occasions, and/or opportunities). A period associated with the set of periodic time resources, in some aspects, may be based on a latency associated with the backscatter-capable device. For example, a period associated with the set of periodic time resources may be based on a (maximum allowable) latency, or time-sensitivity, associated with the backscatter-capable device and/or a related UL transmission (e.g., an application, a type of sensor, or a type of information associated with the backscatter-capable device and/or the related UL transmission). For example, referring to FIGS. 7 and 9, the semi-passive RFID tag 704 or the semi-passive IoT device 904 may receive the FDD configuration 906.

In some aspects, the backscatter-capable device may receive, from the network device, a fourth indication of a time gap applied by the network device between receiving the UL trigger and transmitting the CW DL transmission. In some aspects, the time gap may be associated with a time gap, or guard time, between a DL transmission and a CW DL transmission as well as a time associated with processing the UL trigger and a time-offset until an end of the DL transmission. For example, referring to FIGS. 7 and 9, the semi-passive RFID tag 704 or the semi-passive IoT device 904 may receive the FDD configuration 906 including the fourth indication of the time gap applied by the base station 902 between receiving the UL trigger and transmitting a CW transmission.

At 1506, the backscatter-capable device may transmit, via the third frequency range, the UL trigger indicating that the backscatter-capable device has information to transmit. For example, 1506 may be performed by baseband processor(s) 2124, antenna(s) 2180, and/or AIoTFDD component 198 of FIG. 21. In some aspects, the UL trigger is associated with a low-power signal. The low-power signal, in some aspects, may be associated with at least one of a reduced MCS index (e.g., an MCS index associated with an MCS or coding rate that is lower than an MCS index associated with an associated UL transmission), a number of bits below a bit threshold, or a transmission power below a power threshold. In some aspects, the UL trigger may indicate one of a time-sensitivity of the information (e.g., a remaining time before the information becomes irrelevant or expires) or a priority of the information. For example, referring to FIGS. 7 and 9, the semi-passive RFID tag 704 or the semi-passive IoT device 904 may transmit the UL trigger 912 (or UL trigger 721).

At 1508, the backscatter-capable device may receive based on the UL trigger and via the first frequency range, a CW DL transmission. For example, 1508 may be performed by baseband processor(s) 2124, antenna(s) 2180, and/or AIoTFDD component 198 of FIG. 21. In some aspects, receiving the CW DL transmission at 1508 may include receiving the CW DL for a continuous period known, or configured, to be sufficient to transmit information via a backscattered UL signal. For example, referring to FIGS. 7 and 9, the semi-passive RFID tag 704 or the semi-passive IoT device 904 may receive CW transmission 713 or 919 from the base station and/or reader 702 or the base station 902.

At 1510, the backscatter-capable device may backscatter, via the second frequency range, the CW DL transmission to include the information. For example, 1510 may be performed by baseband processor(s) 2124, antenna(s) 2180, and/or AIoTFDD component 198 of FIG. 21. In some aspects, the CW DL transmission backscattered by the backscatter-capable device may be an UL transmission with the information encoded by the backscattering operation (e.g., a modulation introduced by the backscattering) and backscattering the information at 1510 includes encoding the information in the backscattered CW DL transmission. For example, referring to FIGS. 7 and 9, the semi-passive RFID tag 704 or the semi-passive IoT device 904 may, at 920, backscatter (and encode) the UL transmission 731 or 921 including the information for transmission to, or reception at, the base station and/or reader 702 or the base station 902.

Figure 16:
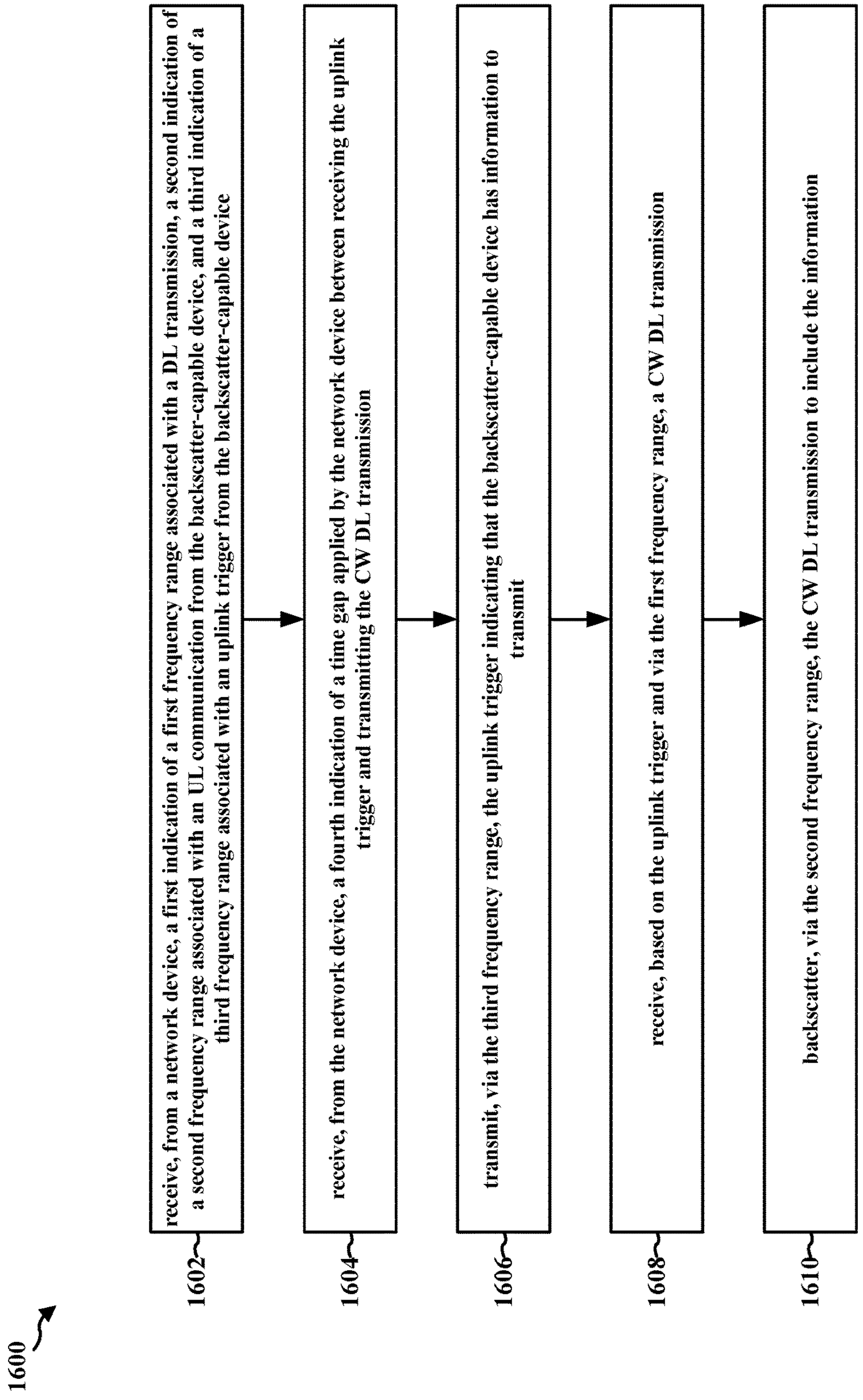
FIG. 16 is a flowchart of a method of wireless communication.

FIG. 16 is a flowchart 1600 of a method of wireless communication. The method may be performed by a backscatter-capable device, e.g., an IoT device such as a semi-passive IoT device (e.g., an RFID tag, RFIC, etc.) or a wireless device (or UE) having at least a set of passive components capable of backscattering an impinging, or CW, transmission and a set of active components capable of transmitting an UL trigger (e.g., a low-power, or low-information, transmission) (e.g., the UE 104; the semi-passive RFID tag 704; the semi-passive IoT device 904; the apparatus 1904, 2104). At 1602, the backscatter-capable device may receive, from a network device, a first indication of a first frequency range associated with a DL transmission, a second indication of a second frequency range associated with an UL communication from the backscatter-capable device, and a third indication of a third frequency range associated with an UL trigger from the backscatter-capable device. For example, 1602 may be performed by baseband processor(s) 2124, antenna(s) 2180, and/or AIoTFDD component 198 of FIG. 21. In some aspects, at least one of the second indication or the third indication may include an indication of a frequency offset from the first frequency range. One or more of the first indication, the second indication, or the third indication may be transmitted via one of a PBCH or DCI. In some aspects, the third indication may include an indication of a set of periodic time resources for transmitting the UL trigger (e.g., a set of UL trigger resources, occasions, and/or opportunities). A period associated with the set of periodic time resources, in some aspects, may be based on a latency associated with the backscatter-capable device. For example, a period associated with the set of periodic time resources may be based on a (maximum allowable) latency, or time-sensitivity, associated with the backscatter-capable device and/or a related UL transmission (e.g., an application, a type of sensor, or a type of information associated with the backscatter-capable device and/or the related UL transmission). For example, referring to FIGS. 7 and 9, the semi-passive RFID tag 704 or the semi-passive IoT device 904 may receive the FDD configuration 906.

At 1604, the backscatter-capable device may receive, from the network device, a fourth indication of a time gap applied by the network device between receiving the UL trigger and transmitting the CW DL transmission. For example, 1604 may be performed by baseband processor(s) 2124, antenna(s) 2180, and/or AIoTFDD component 198 of FIG. 21. In some aspects, the time gap may be associated with a time gap, or guard time, between a DL transmission and a CW DL transmission as well as a time associated with processing the UL trigger and a time-offset until an end of the DL transmission. For example, referring to FIGS. 7 and 9, the semi-passive RFID tag 704 or the semi-passive IoT device 904 may receive the FDD configuration 906 including the fourth indication of the time gap applied by the base station 902 between receiving the UL trigger and transmitting a CW transmission.

At 1606, the backscatter-capable device may transmit, via the third frequency range, the UL trigger indicating that the backscatter-capable device has information to transmit. For example, 1606 may be performed by baseband processor(s) 2124, antenna(s) 2180, and/or AIoTFDD component 198 of FIG. 21. In some aspects, the UL trigger is associated with a low-power signal. The low-power signal, in some aspects, may be associated with at least one of a reduced MCS index (e.g., an MCS index associated with an MCS or coding rate that is lower than an MCS index associated with an associated UL transmission), a number of bits below a bit threshold, or a transmission power below a power threshold. In some aspects, the UL trigger may indicate one of a time-sensitivity of the information (e.g., a remaining time before the information becomes irrelevant or expires) or a priority of the information. For example, referring to FIGS.

7 and 9, the semi-passive RFID tag 704 or the semi-passive IoT device 904 may transmit the UL trigger 912 (or UL trigger 721).

At 1608, the backscatter-capable device may receive based on the UL trigger and via the first frequency range, a CW DL transmission. For example, 1608 may be performed by baseband processor(s) 2124, antenna(s) 2180, and/or AIoTFDD component 198 of FIG. 21. In some aspects, receiving the CW DL transmission at 1608 may include receiving the CW DL for a continuous period known, or configured, to be sufficient to transmit information via a backscattered UL signal. For example, referring to FIGS. 7 and 9, the semi-passive RFID tag 704 or the semi-passive IoT device 904 may receive CW transmission 713 or 919 from the base station and/or reader 702 or the base station 902.

At 1610, the backscatter-capable device may backscatter, via the second frequency range, the CW DL transmission to include the information. For example, 1610 may be performed by baseband processor(s) 2124, antenna(s) 2180, and/or AIoTFDD component 198 of FIG. 21. In some aspects, the CW DL transmission backscattered by the backscatter-capable device may be an UL transmission with the information encoded by the backscattering operation (e.g., a modulation introduced by the backscattering) and backscattering the information at 1610 includes encoding the information in the backscattered CW DL transmission. For example, referring to FIGS. 7 and 9, the semi-passive RFID tag 704 or the semi-passive IoT device 904 may, at 920, backscatter (and encode) the UL transmission 731 or 921 including the information for transmission to, or reception at, the base station and/or reader 702 or the base station 902.

Figure 17:
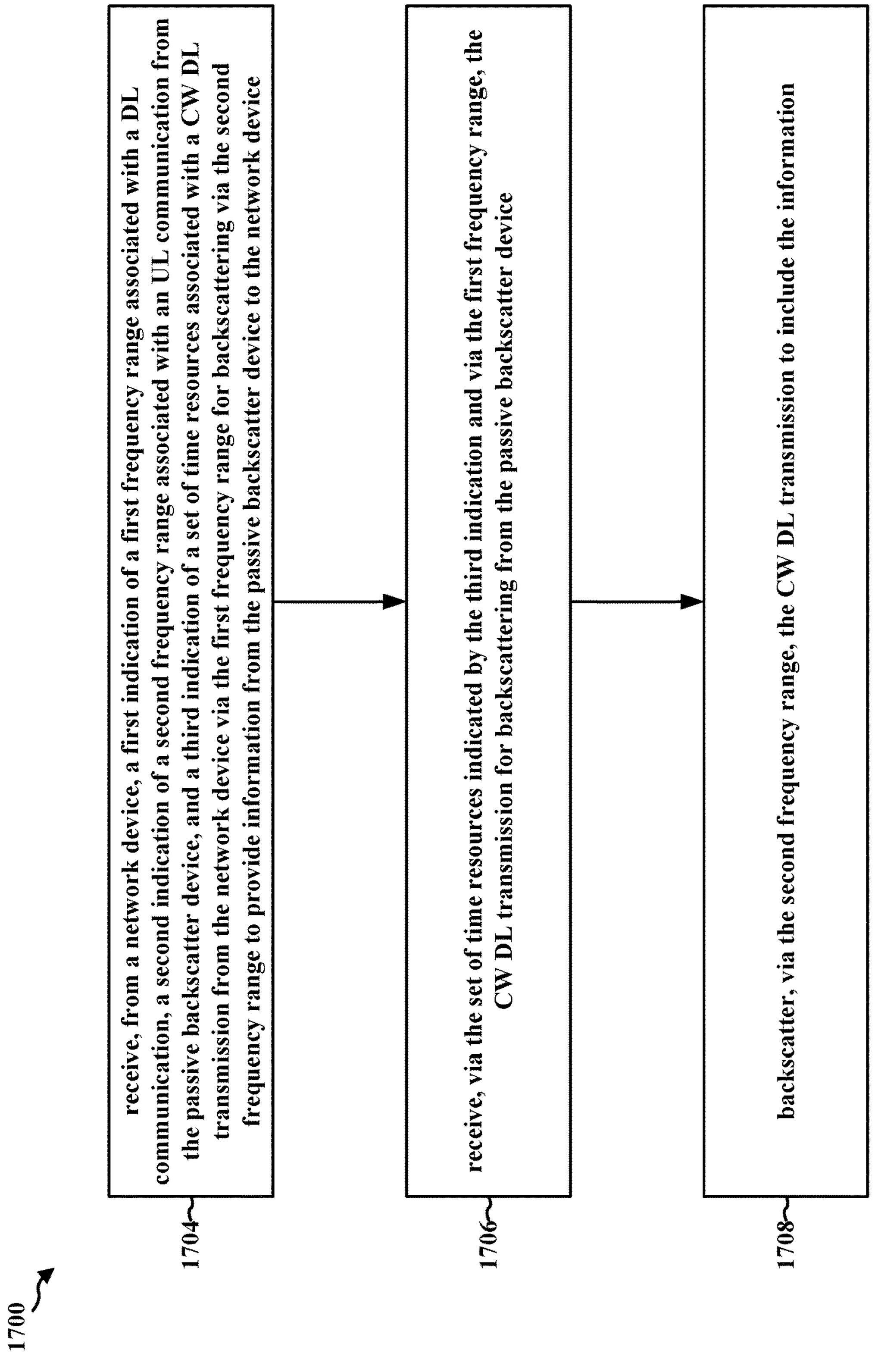
FIG. 17 is a flowchart of a method of wireless communication.

FIG. 17 is a flowchart 1700 of a method of wireless communication. The method may be performed by a passive backscatter device, e.g., an IoT device such as a semi-passive IoT device (e.g., an RFID tag, RFIC, etc.) or a wireless device (or UE) having at least a set of passive components capable of backscattering an impinging, or CW, transmission (e.g., the UE 104; the semi-passive RFID tag 704; the passive RFID tag 804; the semi-passive IoT device 904; the passive IoT device 1004; the apparatus 1904, 2104). In some aspects, the passive backscatter device may perform a synchronization operation with a network device. In some aspects, the synchronization operation may be used to define and/or identify resources associated with different aspects of the FDD operation of the base station and the passive backscatter device. For example, referring to FIGS. 8 and 10, the passive RFID tag 804 or the passive IoT device 1004 may perform a synchronization operation associated with the transmissions 1008.

At 1704, the passive backscatter device may receive, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. For example, 1704 may be performed by baseband processor(s) 2124, antenna(s) 2180, and/or AIoTFDD component 198 of FIG. 21. In some aspects, at least one of the second indication or the third indication may include an indication of a frequency offset from the first frequency range. One or more of the first indication, the second indication, and/or the third indication may be received via one of a PBCH or DCI. In some aspects, the third indication may include a reference time, a duration, and a period associated with transmitting the CW DL transmission from the network device. A period associated with the set of periodic time resources, in some aspects, may be based on a latency associated with the passive backscatter device. For example, a period associated with the set of periodic time resources may be based on a (maximum allowable) latency, or time-sensitivity, associated with the passive backscatter device and/or a related UL transmission (e.g., an application, a type of sensor, or a type of information associated with the passive backscatter device and/or the related UL transmission). In some aspects, the synchronization operation may occur after transmitting at least one of the first indication, the second indication, and/or the third indication, where the set of time resources associated with the third indication may be identified based on the synchronization operation between the network device and the passive backscatter device. For example, referring to FIGS. 8 and 10, the passive RFID tag 804 or the passive IoT device 1004 may receive the FDD configuration 1006.

At 1706, the passive backscatter device may receive, via the set of time resources indicated by the third indication and via the first frequency range, the CW DL transmission for backscattering from the passive backscatter device. For example, 1706 may be performed by baseband processor(s) 2124, antenna(s) 2180, and/or AIoTFDD component 198 of FIG. 21. In some aspects, receiving the CW DL transmission at 1706 may include harvesting energy from the CW DL transmission. For example, referring to FIGS. 8 and 10, the passive RFID tag 804 or the passive IoT device 1004 may receive the CW transmission 813, 1017, or 1029.

At 1708, the passive backscatter device may backscatter, via the second frequency range, the CW DL transmission to include the information. For example, 1708 may be performed by baseband processor(s) 2124, antenna(s) 2180, and/or AIoTFDD component 198 of FIG. 21. In some aspects, the CW DL transmission backscattered by the backscatter-capable device may be an UL transmission with the information encoded by the backscattering operation (e.g., a modulation introduced by the backscattering) and backscattering the information at 1708 includes encoding the information in the backscattered CW DL transmission. For example, referring to FIGS. 8 and 10, the passive RFID tag 804 or the passive IoT device 1004 may, at 1018, backscatter (and encode) the UL transmission 831 or 1019 including the information for transmission to, or reception at, the base station and/or reader 802 or the base station 1002.

In some aspects, the passive backscatter device may receive a fourth indication of an updated set of time resources associated with the CW DL transmission from the base station. In some aspects, the updated set of time resources may include an updated period associated with transmitting the CW DL transmission from the base station. The fourth indication, in some aspects, may be received via one of a PBCH or DCI. In some aspects, the fourth indication may include an update to one or more of the reference time, the duration, and/or the period associated with transmitting the CW DL transmission from the network device. The fourth indication, in some aspects, may be based on the information associated with backscattering the CW DL transmission at 1708. For example, referring to FIGS. 8 and 10, the passive RFID tag 804 or the passive IoT device 1004 may receive the FDD configuration 1006 (e.g., after a previous process similar to the process illustrated in FIG. 10).

Figure 18:
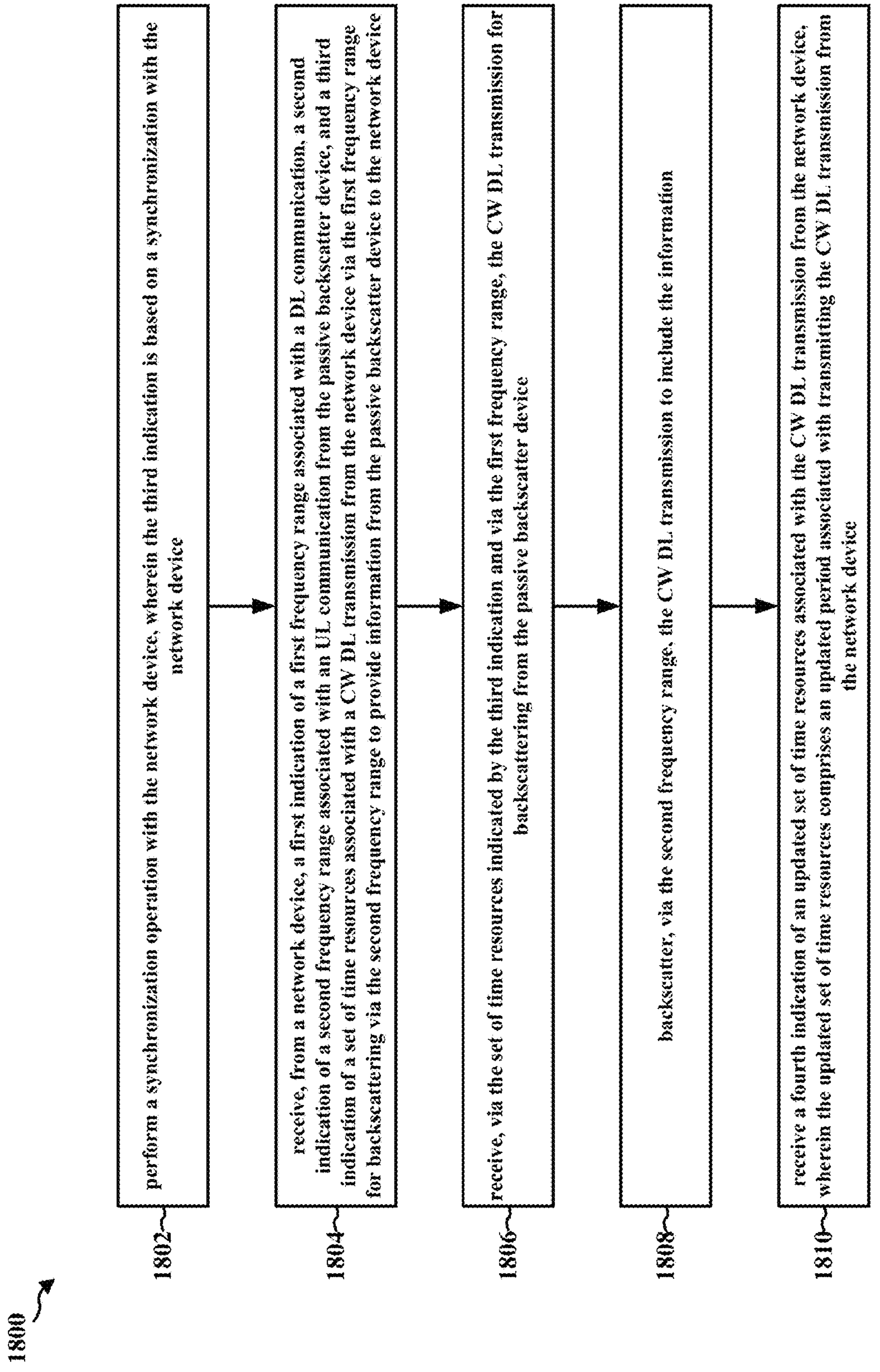
FIG. 18 is a flowchart of a method of wireless communication.

FIG. 18 is a flowchart 1800 of a method of wireless communication. The method may be performed by a passive backscatter device, e.g., an IoT device such as a semi-passive IoT device (e.g., an RFID tag, RFIC, etc.) or a wireless device (or UE) having at least a set of passive components capable of backscattering an impinging, or CW, transmission (e.g., the UE 104; the semi-passive RFID tag 704; the passive RFID tag 804; the semi-passive IoT device 904; the passive IoT device 1004; the apparatus 1904, 2104). At 1802, the passive backscatter device may perform a synchronization operation with a network device. For example, 1802 may be performed by baseband processor(s) 2124, antenna(s) 2180, and/or AIoTFDD component 198 of FIG. 21. In some aspects, the synchronization operation at 1802 may be used to define and/or identify resources associated with different aspects of the FDD operation of the base station and the passive backscatter device. For example, referring to FIGS. 8 and 10, the passive RFID tag 804 or the passive IoT device 1004 may perform a synchronization operation associated with the transmissions 1008.

At 1804, the passive backscatter device may receive, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. For example, 1804 may be performed by baseband processor(s) 2124, antenna(s) 2180, and/or AIoTFDD component 198 of FIG. 21. In some aspects, at least one of the second indication or the third indication may include an indication of a frequency offset from the first frequency range. One or more of the first indication, the second indication, and/or the third indication may be received via one of a PBCH or DCI. In some aspects, the third indication may include a reference time, a duration, and a period associated with transmitting the CW DL transmission from the network device. A period associated with the set of periodic time resources, in some aspects, may be based on a latency associated with the passive backscatter device. For example, a period associated with the set of periodic time resources may be based on a (maximum allowable) latency, or time-sensitivity, associated with the passive backscatter device and/or a related UL transmission (e.g., an application, a type of sensor, or a type of information associated with the passive backscatter device and/or the related UL transmission). In some aspects, the synchronization operation at 1802 may occur after transmitting at least one of the first indication, the second indication, and/or the third indication, where the set of time resources associated with the third indication may be identified based on the synchronization operation between the network device and the passive backscatter device. For example, referring to FIGS. 8 and 10, the passive RFID tag 804 or the passive IoT device 1004 may receive the FDD configuration 1006.

At 1806, the passive backscatter device may receive, via the set of time resources indicated by the third indication and via the first frequency range, the CW DL transmission for backscattering from the passive backscatter device. For example, 1806 may be performed by baseband processor(s) 2124, antenna(s) 2180, and/or AIoTFDD component 198 of FIG. 21. In some aspects, receiving the CW DL transmission at 1806 may include harvesting energy from the CW DL transmission. For example, referring to FIGS. 8 and 10, the passive RFID tag 804 or the passive IoT device 1004 may receive the CW transmission 813, 1017, or 1029.

At 1808, the passive backscatter device may backscatter, via the second frequency range, the CW DL transmission to include the information. For example, 1808 may be performed by baseband processor(s) 2124, antenna(s) 2180, and/or AIoTFDD component 198 of FIG. 21. In some aspects, the CW DL transmission backscattered by the backscatter-capable device may be an UL transmission with the information encoded by the backscattering operation (e.g., a modulation introduced by the backscattering) and backscattering the information at 1808 includes encoding the information in the backscattered CW DL transmission. For example, referring to FIGS. 8 and 10, the passive RFID tag 804 or the passive IoT device 1004 may, at 1018, backscatter (and encode) the UL transmission 831 or 1019 including the information for transmission to, or reception at, the base station and/or reader 802 or the base station 1002.

At 1810, the passive backscatter device may receive a fourth indication of an updated set of time resources associated with the CW DL transmission from the base station. For example, 1810 may be performed by baseband processor(s) 2124, antenna(s) 2180, and/or AIoTFDD component 198 of FIG. 21. In some aspects, the updated set of time resources may include an updated period associated with transmitting the CW DL transmission from the base station. The fourth indication, in some aspects, may be received via one of a PBCH or DCI. In some aspects, the fourth indication may include an update to one or more of the reference time, the duration, and/or the period associated with transmitting the CW DL transmission from the network device. The fourth indication, in some aspects, may be based on the information associated with backscattering the CW DL transmission at 1808. For example, referring to FIGS. 8 and 10, the passive RFID tag 804 or the passive IoT device 1004 may receive the FDD configuration 1006 (e.g., after a previous process similar to the process illustrated in FIG. 10).

Figure 19:
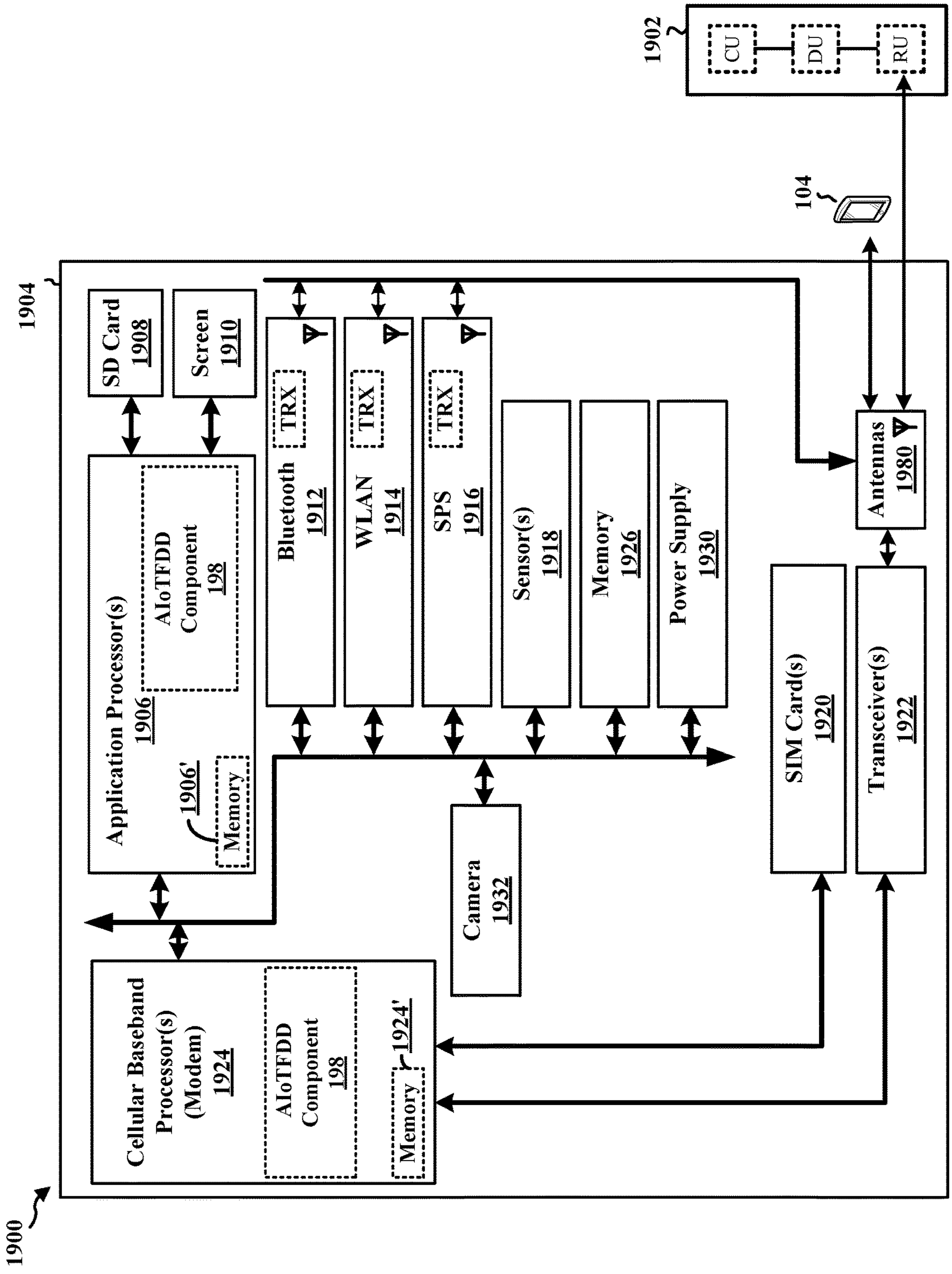
FIG. 19 is a diagram illustrating an example of a hardware implementation for an apparatus.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include at least one cellular baseband processor 1924 (also referred to as a modem) coupled to one or more transceivers 1922 (e.g., cellular RF transceiver). The cellular baseband processor(s) 1924 may include at least one on-chip memory 1924'. In some aspects, the apparatus 1904 may further include one or more subscriber identity modules (SIM) cards 1920 and at least one application processor 1906 coupled to a secure digital (SD) card 1908 and a screen 1910. The application processor(s) 1906 may include on-chip memory 1906'. In some aspects, the apparatus 1904 may further include a Bluetooth module 1912, a WLAN module 1914, an SPS module 1916 (e.g., GNSS module), one or more sensor modules 1918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize one or more antennas 1980 for communication. The cellular baseband processor(s) 1924 communicates through the transceiver(s) 1922 via the one or more antennas 1980 with the UE 104 and/or with an RU associated with a network entity 1902. The cellular baseband processor(s) 1924 and the application processor(s) 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor(s) 1924 and the application processor(s) 1906 are each responsible for general processing, including the execution of software stored on the computer-readable medium/memory. The software, when executed by the cellular baseband processor(s) 1924/application processor(s) 1906, causes the cellular baseband processor(s) 1924/application processor(s) 1906 to perform the various functions described supra. The computer-readable medium/memory may also be used for storing data that is manipulated by the cellular baseband processor(s) 1924/application processor(s) 1906 when executing software. The cellular baseband processor(s) 1924/application processor(s) 1906 may be a component of the UE 350 and may include the at least one memory 360 and/or at least one of the TX processor 368, the RX processor 356, and the controller/processor 359. In one configuration, the apparatus 1904 may be at least one processor chip (modem and/or application) and include just the cellular baseband processor(s) 1924 and/or the application processor(s) 1906, and in another configuration, the apparatus 1904 may be the entire UE (e.g., see UE 350 of FIG. 3) and include the additional modules of the apparatus 1904.

As discussed supra, the AIoTFDD component 198 may be configured to receive, from a network device, a first indication of a first frequency range associated with a DL transmission, a second indication of a second frequency range associated with an UL communication from the backscatter-capable device, and a third indication of a third frequency range associated with an UL trigger from the backscatter-capable device. The AIoTFDD component 198 may further be configured to transmit, via the third frequency range, the UL trigger indicating that the backscatter-capable device has information to transmit. The AIoTFDD component 198 may also be configured to receive, based on the UL trigger and via the first frequency range, a CW DL transmission and backscatter, via the second frequency range, the CW DL transmission to include the information. In some aspects, the AIoTFDD component 198 may be configured to receive, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The AIoTFDD component 198 receive, via the set of time resources indicated by the third indication and via the first frequency range, the CW DL transmission for backscattering from the passive backscatter device and backscatter, via the second frequency range, the CW DL transmission to include the information. The AIoTFDD component 198 may be within the cellular baseband processor(s) 1924, the application processor(s) 1906, or both the cellular baseband processor(s) 1924 and the application processor(s) 1906. The AIoTFDD component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1904 may include a variety of components configured for various functions. In one configuration, the apparatus 1904, and in particular the cellular baseband processor(s) 1924 and/or the application processor(s) 1906, may include means for receiving, from a network device, a first indication of a first frequency range associated with a DL transmission, a second indication of a second frequency range associated with an UL communication from the backscatter-capable device, and a third indication of a third frequency range associated with an UL trigger from the backscatter-capable device. The apparatus 1904, and in particular the cellular baseband processor(s) 1924 and/or the application processor(s) 1906, in some aspects, may include means for transmitting, via the third frequency range, the UL trigger indicating that the backscatter-capable device has information to transmit. The apparatus 1904, and in particular the cellular baseband processor(s) 1924 and/or the application processor(s) 1906, in some aspects, may include means for receiving, based on the UL trigger and via the first frequency range, a CW DL transmission. The apparatus 1904, and in particular the cellular baseband processor(s) 1924 and/or the application processor(s) 1906, in some aspects, may include means for backscattering, via the second frequency range, the CW DL transmission to include the information. The apparatus 1904, and in particular the cellular baseband processor(s) 1924 and/or the application processor(s) 1906, in some aspects, may include means for receiving, from the network device, a fourth indication of a time gap applied by the network device between receiving the UL trigger and transmitting the CW DL transmission. The apparatus 1904, and in particular the cellular baseband processor(s) 1924 and/or the application processor(s) 1906, in some aspects, may include means for receiving, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The apparatus 1904, and in particular the cellular baseband processor(s) 1924 and/or the application processor(s) 1906, in some aspects, may include means for receiving, via the set of time resources indicated by the third indication and via the first frequency range, the CW DL transmission for backscattering from the passive backscatter device. The apparatus 1904, and in particular the cellular baseband processor(s) 1924 and/or the application processor(s) 1906, in some aspects, may include means for receiving a fourth indication of an updated set of time resources associated with the CW DL transmission from the network device, wherein the updated set of time resources comprises an updated period associated with transmitting the CW DL transmission from the network device. The apparatus 1904, and in particular the cellular baseband processor(s) 1924 and/or the application processor(s) 1906, in some aspects, may include means for performing a synchronization operation with the network device, wherein the third indication is associated with a synchronization with the network device. The means may be the AIoTFDD component 198 of the apparatus 1904 configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to any of FIGS. 15-18.

Figure 20:
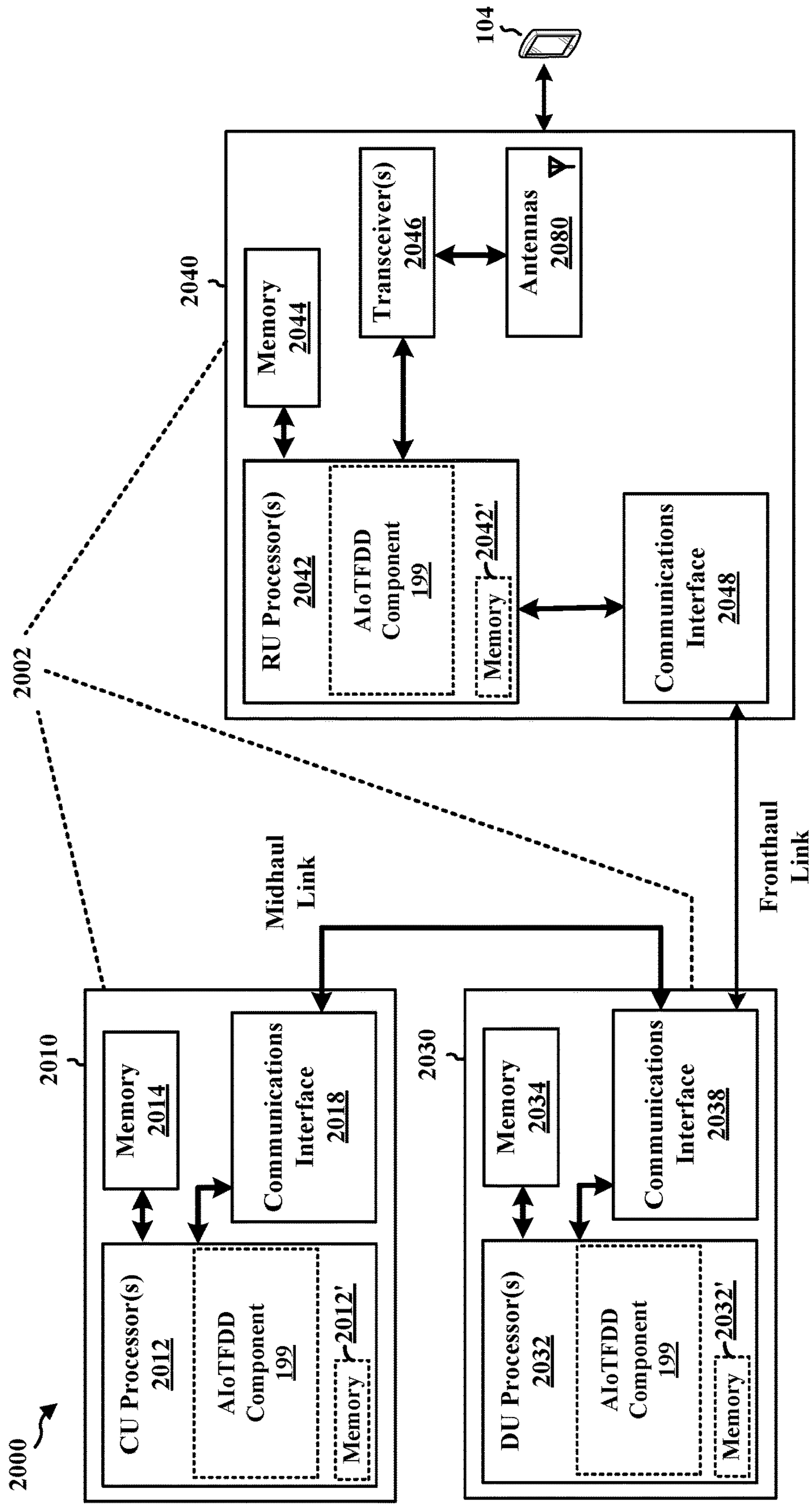
FIG. 20 is a diagram illustrating an example of a hardware implementation for a network entity.

FIG. 20 is a diagram 2000 illustrating an example of a hardware implementation for a network entity 2002. The network entity 2002 may be a BS, a component of a BS, or may implement BS functionality. The network entity 2002 may include at least one of a CU 2010, a DU 2030, or an RU 2040. For example, depending on the layer functionality handled by the AIoTFDD component 199, the network entity 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include at least one CU processor 2012. The CU processor(s) 2012 may include on-chip memory 2012'. In some aspects, the CU 2010 may further include additional memory modules 2014 and a communications interface 2018. The CU 2010 communicates with the DU 2030 through a midhaul link, such as an F1 interface. The DU 2030 may include at least one DU processor 2032. The DU processor(s) 2032 may include on-chip memory 2032'. In some aspects, the DU 2030 may further include additional memory modules 2034 and a communications interface 2038. The DU 2030 communicates with the RU 2040 through a fronthaul link. The RU 2040 may include at least one RU processor 2042. The RU processor(s) 2042 may include on-chip memory 2042'. In some aspects, the RU 2040 may further include additional memory modules 2044, one or more transceivers 2046, one or more antennas 2080, and a communications interface 2048. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the AIoTFDD component 199 may be configured to transmit, to a backscatter-capable device, a first indication of a first frequency range associated with a DL transmission, a second indication of a second frequency range associated with an UL communication from the backscatter-capable device, and a third indication of a third frequency range associated with an UL trigger from the backscatter-capable device. The AIoTFDD component 199 may further be configured to receive, via the third frequency range, the UL trigger indicating that the backscatter-capable device has information to transmit. The AIoTFDD component 199 may also be configured to transmit, based on receiving the UL trigger and via the first frequency range, a CW DL transmission for backscattering from the backscatter-capable device and receive, via the second frequency range, the information from the backscatter-capable device via the CW DL transmission backscattered by the backscatter-capable device. In some aspects, the AIoTFDD component 199 may be configured to transmit, to a backscatter-capable device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The AIoTFDD component 199 transmit, via the set of time resources indicated by the third indication and via the first frequency range, the CW DL transmission for backscattering from the passive backscatter device and receive, via the second frequency range, the information from the passive backscatter device via the CW DL transmission backscattered by the passive backscatter device. The AIoTFDD component 199 may be within one or more processors of one or more of the CU 2010, DU 2030, and the RU 2040. The AIoTFDD component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2002 may include a variety of components configured for various functions. In one configuration, the network entity 2002 may include means for transmitting, to a backscatter-capable device, a first indication of a first frequency range associated with a DL transmission, a second indication of a second frequency range associated with an UL communication from the backscatter-capable device, and a third indication of a third frequency range associated with an UL trigger from the backscatter-capable device. The network entity 2002, in some aspects, may include means for receiving, via the third frequency range, the UL trigger indicating that the backscatter-capable device has information to transmit. The network entity 2002, in some aspects, may include means for transmitting, based on receiving the UL trigger and via the first frequency range, a CW DL transmission for backscattering from the backscatter-capable device. The network entity 2002, in some aspects, may include means for receiving, via the second frequency range, the information from the backscatter-capable device via the CW DL transmission backscattered by the backscatter-capable device. The network entity 2002, in some aspects, may include means for omitting, based on one of the time-sensitivity of the information or the priority of the information, a non-CW DL transmission via the first frequency range in order to transmit the CW DL transmission. The network entity 2002, in some aspects, may include means for transmitting, to the backscatter-capable device, a fourth indication of a time gap applied by the network device between receiving the UL trigger and transmitting the CW DL transmission. The network entity 2002, in some aspects, may include means for monitoring the third frequency range for the UL trigger. The network entity 2002, in some aspects, may include means for transmitting, to a passive backscatter device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The network entity 2002, in some aspects, may include means for transmitting, via the set of time resources indicated by the third indication and via the first frequency range, the CW DL transmission for backscattering from the passive backscatter device. The network entity 2002, in some aspects, may include means for receiving, via the second frequency range, the information from the passive backscatter device via the CW DL transmission backscattered by the passive backscatter device. The network entity 2002, in some aspects, may include means for transmitting a fourth indication of an updated set of time resources associated with the CW DL transmission from the network device, wherein the updated set of time resources comprises an updated period associated with transmitting the CW DL transmission from the network device. The network entity 2002, in some aspects, may include means for performing a synchronization operation with the passive backscatter device, wherein the third indication is based on synchronization between the network device and the passive backscatter device. The means may be the AIoTFDD component 199 of the network entity 2002 configured to perform the functions recited by the means. As described supra, the network entity 2002 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 11-14.

Figure 21:
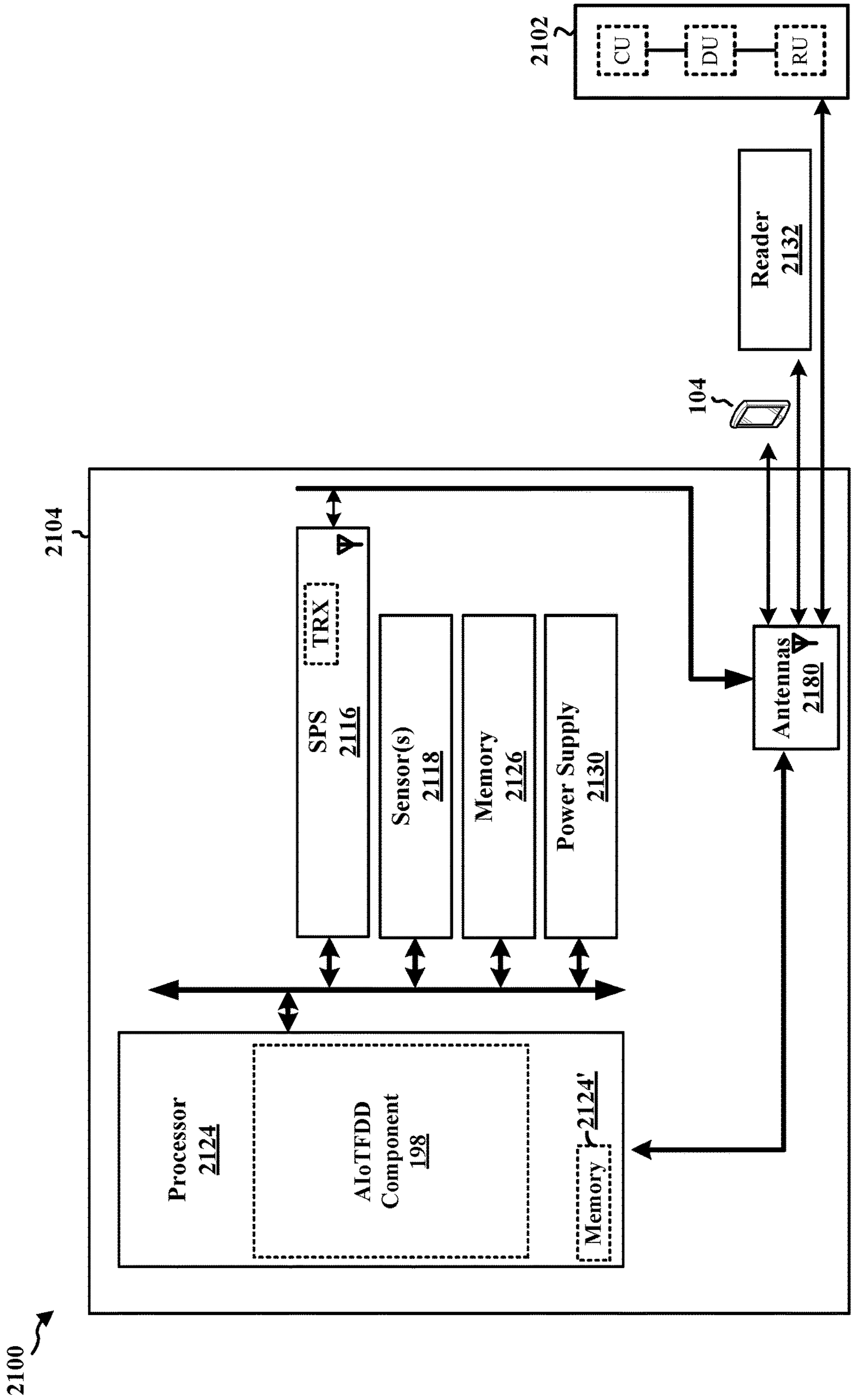
FIG. 21 is a diagram illustrating an example of a hardware implementation for an apparatus.

FIG. 21 is a diagram 2100 illustrating an example of a hardware implementation for an apparatus 2104. The apparatus may be an energy harvesting device (e.g., a backscatter device, a tag, etc.). The apparatus may include aspects described in connection with FIGS. 4 and 5, among other examples. In some aspects, the apparatus 2104 may be a UE, a component of a UE, or may implement UE functionality, similar to the apparatus described in connection with FIG. 19. In some aspects, the apparatus 2104 may include at least one processor 2124 coupled to one or more antennas 2180. The processor(s) 2124 may provide an energy harvesting component, such as described in connection with FIGS. 4 and 5. The processor(s) 2124 may include memory 2124'. In some aspects, the apparatus 2104 may further include an SPS module 2116 (e.g., GNSS module), one or more sensor modules 2118 (e.g., barometric pressure sensor/altimeter; motion sensor such as IMU, gyroscope, and/or accelerometer(s); LIDAR, RADAR, SONAR, magnetometer, audio and/or other technologies used for positioning), additional memory modules 2126, and/or a power supply or storage device 2130. The SPS module 2116 may include an on-chip TRX (or in some cases, just a RX). The SPS module 2116 may include its own dedicated antennas and/or utilize the antennas 2180 for communication. The processor(s) 2124 receives a signal, such as a backscatter signal, and harvest energy from the receive signal. The processor(s) 2124 receives the signal via the one or more antennas 2180 from the UE 104, reader 2132 and/or an RU associated with a network entity 2102. The processor(s) 2124 may include a computer-readable medium/memory 2124'. The additional memory modules 2126 may also be considered a computer-readable medium/memory. Each computer-readable medium/memory 2124', 2126 may be non-transitory. The processor(s) 2124 is responsible for general processing, including the execution of software stored on the computer-readable medium/memory. The software, when executed by the processor 2124, causes the processor(s) 2124 to perform the various functions described supra. The computer-readable medium/memory may also be used for storing data that is manipulated by the processor(s) 2124 when executing software. In some aspects, the processor(s) 2124 may be a component of the UE 350, or other energy harvesting device, and may include the memory 360 and/or at least one of the TX processor 368, the RX processor 356, and the controller/processor 359. In one configuration, the apparatus 2104 may be an energy harvesting device. In other configurations, the apparatus 2104 may be an energy harvesting component of a device.

As discussed supra, the AIoTFDD component 198 that may be configured to receive, from a network device, a first indication of a first frequency range associated with a DL transmission, a second indication of a second frequency range associated with an UL communication from the backscatter-capable device, and a third indication of a third frequency range associated with an UL trigger from the backscatter-capable device. The AIoTFDD component 198 may further be configured to transmit, via the third frequency range, the UL trigger indicating that the backscatter-capable device has information to transmit. The AIoTFDD component 198 may also be configured to receive, based on the UL trigger and via the first frequency range, a CW DL transmission and backscatter, via the second frequency range, the CW DL transmission to include the information. In some aspects, the AIoTFDD component 198 may be configured to receive, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The AIoTFDD component 198 receive, via the set of time resources indicated by the third indication and via the first frequency range, the CW DL transmission for backscattering from the passive backscatter device and backscatter, via the second frequency range, the CW DL transmission to include the information. The AIoTFDD component 198 may be within the processor(s) 2124. The AIoTFDD component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2104 may include a variety of components configured for various functions. In one configuration, the apparatus 2104, and in particular the processor(s) 2124, may include means for receiving, from a network device, a first indication of a first frequency range associated with a DL transmission, a second indication of a second frequency range associated with an UL communication from the backscatter-capable device, and a third indication of a third frequency range associated with an UL trigger from the backscatter-capable device. The apparatus 2104, and in particular the processor 2124, in some aspects, may include means for transmitting, via the third frequency range, the UL trigger indicating that the backscatter-capable device has information to transmit. The apparatus 2104, and in particular the processor 2124, in some aspects, may include means for receiving, based on the UL trigger and via the first frequency range, a CW DL transmission. The apparatus 2104, and in particular the processor 2124, in some aspects, may include means for backscattering, via the second frequency range, the CW DL transmission to include the information. The apparatus 2104, and in particular the processor 2124, in some aspects, may include means for receiving, from the network device, a fourth indication of a time gap applied by the network device between receiving the UL trigger and transmitting the CW DL transmission. The apparatus 2104, and in particular the processor 2124, in some aspects, may include means for receiving, from a network device, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The apparatus 2104, and in particular the processor 2124, in some aspects, may include means for receiving, via the set of time resources indicated by the third indication and via the first frequency range, the CW DL transmission for backscattering from the passive backscatter device. The apparatus 2104, and in particular the processor 2124, in some aspects, may include means for receiving a fourth indication of an updated set of time resources associated with the CW DL transmission from the network device, wherein the updated set of time resources comprises an updated period associated with transmitting the CW DL transmission from the network device. The apparatus 2104, and in particular the processor 2124, in some aspects, may include means for performing a synchronization operation with the network device, wherein the third indication is associated with a synchronization with the network device. The means may be the AIoTFDD component 198 of the apparatus 2104 configured to perform the functions recited by the means or as described in relation to FIGS. 15-18. As described supra, in some aspects, the apparatus 2104 may include the TX processor 368, the RX processor 356, and the controller/processor 359. As such, in one configuration, the means may be the TX processor 368, the RX processor 356, and/or the controller/processor 359 configured to perform the functions recited by the means. In some aspects, the means may include the processor(s) 2124 and/or the antennas 2180.

This disclosure proposes FDD communications for Ambient IoT devices based on two approaches 1) UL trigger based communication followed by backscattering of a CW and 2) non-trigger based communication relying solely on backscattering. Various aspects relate generally to enabling FDD operation to provide a mechanism for an IoT device (e.g., a passive, or semi-passive, IoT device or component) to initiate traffic in association with ambient IoT (e.g., an UL transmission via backscattering). Some aspects more specifically relate to providing a configuration and an associated method for initiating ambient IoT communication from an IoT device (e.g., a passive, semi-passive, or active, IoT device). In some examples, a base station and/or reader may transmit, and a backscatter-capable device may receive, a first indication of a first frequency range associated with a DL transmission, a second indication of a second frequency range associated with an UL communication from the backscatter-capable device, and a third indication of a third frequency range associated with an UL trigger from the backscatter-capable device. The backscatter-capable device may be configured to transmit, and the base station and/or reader may further be configured to receive, via the third frequency range, the UL trigger indicating that the backscatter-capable device has information to transmit. The base station and/or reader may also be configured to transmit, based on receiving the UL trigger and via the first frequency range, a CW DL transmission for backscattering from the backscatter-capable device. The backscatter-capable device may be configured to receive, based on the UL trigger and via the first frequency range, a CW DL transmission and backscatter, via the second frequency range, the CW DL transmission to include the information. The base station and/or reader may also be configured to receive, via the second frequency range, the information from the backscatter-capable device via the CW DL transmission backscattered by the backscatter-capable device.

In some examples, a base station and/or reader may transmit, and a passive backscatter device may receive, a first indication of a first frequency range associated with a DL communication, a second indication of a second frequency range associated with an UL communication from the passive backscatter device, and a third indication of a set of time resources associated with a CW DL transmission from the network device via the first frequency range for backscattering via the second frequency range to provide information from the passive backscatter device to the network device. The base station and/or reader may also be configured to transmit, via the set of time resources indicated by the third indication and via the first frequency range, the CW DL transmission for backscattering from the passive backscatter device. The passive backscatter device may be configured to receive, via the set of time resources indicated by the third indication and via the first frequency range, the CW DL transmission for backscattering from the passive backscatter device and backscatter, via the second frequency range, the CW DL transmission to include the information. The base station and/or reader may also be configured to receive, via the second frequency range, the information from the passive backscatter device via the CW DL transmission backscattered by the passive backscatter device.

Particular aspects of the subject matter described in this disclosure can be implemented to realize one or more of the following potential advantages. In some examples, by providing communication capabilities for IoT sensors, the described techniques can be used to enable data reporting for ambient IoT devices (e.g., sensors).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather “one or more.” Terms such as “if,” “when,” and “while” do not imply an immediate temporal relationship or reaction. That is, these phrases, e.g., “when,” do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication for a network device, comprising: transmitting, to a backscatter-capable device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device; receiving, via the third frequency range, the UL trigger indicating that the backscatter-capable device has information to transmit; transmitting, based on receiving the UL trigger and via the first frequency range, a continuous wave (CW) DL transmission for backscattering from the backscatter-capable device; and receiving, via the second frequency range, the information from the backscatter-capable device via the CW DL transmission backscattered by the backscatter-capable device.

Aspect 2 is the method of aspect 1, wherein the UL trigger is associated with a low-power signal, wherein the low-power signal is associated with at least one of a reduced modulation and coding scheme (MCS) index, a number of bits below a bit threshold, or a transmission power below a power threshold.

Aspect 3 is the method of aspect 2, wherein the UL trigger indicates one of a time-sensitivity of the information or a priority of the information.

Aspect 4 is the method of aspect 3, further comprising: omitting, based on one of the time-sensitivity of the information or the priority of the information, a non-CW DL transmission via the first frequency range in order to transmit the CW DL transmission.

Aspect 5 is the method of any of aspects 1 to 4, further comprising: transmitting, to the backscatter-capable device, a fourth indication of a time gap applied by the network device between receiving the UL trigger and transmitting the CW DL transmission.

Aspect 6 is the method of any of aspects 1 to 5, wherein at least one of the second indication or the third indication comprises an indication of a frequency offset from the first frequency range.

Aspect 7 is the method of any of aspects 1 to 6, further comprising: monitoring the third frequency range for the UL trigger.

Aspect 8 is the method of any of aspects 1 to 7, wherein at least one of the first indication, the second indication, or the third indication is transmitted via one of a physical broadcast channel (PBCH) or downlink control information (DCI).

Aspect 9 is the method of any of aspects 1 to 8, wherein the third indication comprises an indication of a set of periodic time resources for transmitting the UL trigger.

Aspect 10 is the method of aspect 9, wherein a period associated with the set of periodic time resources is based on a latency associated with the backscatter-capable device.

Aspect 11 is a method of wireless communication for a network device, comprising: transmitting, to a passive backscatter device, a first indication of a first frequency range associated with a downlink (DL) communication, a second indication of a second frequency range associated with an uplink (UL) communication from the passive backscatter device, and a third indication of a set of time resources associated with a continuous wave (CW) DL transmission from the network device via the first frequency range for backscattering via the second frequency range to provide information from the passive backscatter device to the network device; transmitting, via the set of time resources indicated by the third indication and via the first frequency range, the CW DL transmission for backscattering from the passive backscatter device; and receiving, via the second frequency range, the information from the passive backscatter device via the CW DL transmission backscattered by the passive backscatter device.

Aspect 12 is the method of aspect 11, wherein the third indication comprises a reference time and a period associated with transmitting the CW DL transmission from the network device.

Aspect 13 is the method of aspect 12, wherein the period is based on a latency associated with the passive backscatter device.

Aspect 14 is the method of any of aspects 12 and 13, further comprising: transmitting a fourth indication of an updated set of time resources associated with the CW DL transmission from the network device, wherein the updated set of time resources comprises an updated period associated with transmitting the CW DL transmission from the network device.

Aspect 15 is the method of any of aspects 11 to 14, wherein at least one of the first indication, the second indication, or the third indication is transmitted via one of a physical broadcast channel (PBCH) or downlink control information (DCI).

Aspect 16 is the method of any of aspects 11 to 15, further comprising: performing a synchronization operation with the passive backscatter device, wherein the third indication is associated with a synchronization between the network device and the passive backscatter device associated with the synchronization operation.

Aspect 17 is a method of wireless communication for a backscatter-capable device, comprising: receiving, from a network device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device; transmitting, via the third frequency range, the UL trigger indicating that the backscatter-capable device has information to transmit; receiving, based on the UL trigger and via the first frequency range, a continuous wave (CW) DL transmission; and backscattering, via the second frequency range, the CW DL transmission to include the information.

Aspect 18 is the method of aspect 17, wherein the UL trigger is associated with a low-power signal, wherein the low-power signal is associated with at least one of a reduced modulation and coding scheme (MCS) index, a number of bits below a bit threshold, or a transmission power below a threshold.

Aspect 19 is the method of aspect 18, wherein the UL trigger indicates one of a time-sensitivity of the information or a priority of the information.

Aspect 20 is the method of any of aspects 17 to 19, further comprising: receiving, from the network device, a fourth indication of a time gap applied by the network device between receiving the UL trigger and transmitting the CW DL transmission.

Aspect 21 is the method of any of aspects 17 to 20, wherein at least one of the second indication or the third indication comprises an indication of a frequency offset from the first frequency range.

Aspect 22 is the method of any of aspects 17 to 21, wherein the third indication comprises an indication of a set of periodic time resources for transmitting the UL trigger.

Aspect 23 is the method of aspect 22, wherein a period associated with the set of periodic time resources is based on a latency associated with the backscatter-capable device.

Aspect 24 is the method of any of aspects 17 to 23, wherein at least one of the first indication, the second indication, or the third indication is transmitted via one of a physical broadcast channel (PBCH) or downlink control information (DCI).

Aspect 25 is a method of wireless communication for a passive backscatter device, comprising: receiving, from a network device, a first indication of a first frequency range associated with a downlink (DL) communication, a second indication of a second frequency range associated with an uplink (UL) communication from the passive backscatter device, and a third indication of a set of time resources associated with a continuous wave (CW) DL transmission from the network device via the first frequency range for backscattering via the second frequency range to provide information from the passive backscatter device to the network device; receiving, via the set of time resources indicated by the third indication and via the first frequency range, the CW DL transmission for backscattering from the passive backscatter device; and backscattering, via the second frequency range, the CW DL transmission to include the information.

Aspect 26 is the method of aspect 25, wherein the third indication comprises a reference time and a period associated with transmitting the CW DL transmission from the network device.

Aspect 27 is the method of aspect 26, wherein the period is based on a latency associated with the passive backscatter device.

Aspect 28 is the method of any of aspects 26 and 27, further comprising: receiving a fourth indication of an updated set of time resources associated with the CW DL transmission from the network device, wherein the updated set of time resources comprises an updated period associated with transmitting the CW DL transmission from the network device.

Aspect 29 is the method of any of aspects 25 to 28, wherein at least one of the first indication, the second indication, or the third indication is received via one of a physical broadcast channel (PBCH) or downlink control information (DCI).

Aspect 30 is the method of any of aspects 25 to 29, further comprising: performing a synchronization operation with the passive backscatter device, wherein the third indication is associated with a synchronization between the network device and the passive backscatter device associated with the synchronization operation.

Aspect 31 is an apparatus for wireless communication at a device including a memory and at least one processor coupled to the memory and, based at least in part on information stored in the memory, the at least one processor is configured to implement any of aspects 1 to 10.

Aspect 32 is the apparatus of aspect 31, further comprising at least one of a transceiver or an antenna coupled to the at least one processor, wherein to transmit at least one of the first indication, the second indication, or the third indication, the at least one processor, individually or in any combination, is configured to transmit, via at least one of the transceiver or the antenna, at least one of the first indication, the second indication, or the third indication via one of a physical broadcast channel (PBCH) or downlink control information (DCI).

Aspect 33 is an apparatus for wireless communication at a device including means for implementing any of aspects 1 to 10.

Aspect 34 is a computer-readable medium (e.g., a non-transitory computer-readable medium) storing computer executable code, where the code when executed by a processor causes the processor to implement any of aspects 1 to 10.

Aspect 35 is an apparatus for wireless communication at a device including a memory and at least one processor coupled to the memory and, based at least in part on information stored in the memory, the at least one processor is configured to implement any of aspects 11 to 16.

Aspect 36 is the apparatus of aspect 35, further comprising at least one of a transceiver or an antenna coupled to the at least one processor, wherein to transmit at least one of the first indication, the second indication, or the third indication, the at least one processor, individually or in any combination, is configured to transmit, via at least one of the transceiver or the antenna, at least one of the first indication, the second indication, or the third indication via one of a physical broadcast channel (PBCH) or downlink control information (DCI).

Aspect 37 is an apparatus for wireless communication at a device including means for implementing any of aspects 11 to 16.

Aspect 38 is a computer-readable medium (e.g., a non-transitory computer-readable medium) storing computer executable code, where the code when executed by a processor causes the processor to implement any of aspects 11 to 16.

Aspect 39 is an apparatus for wireless communication at a device including a memory and at least one processor coupled to the memory and, based at least in part on information stored in the memory, the at least one processor is configured to implement any of aspects 17 to 24.

Aspect 40 is the apparatus of aspect 39, further comprising at least one of a transceiver or an antenna coupled to the at least one processor, wherein to receive at least one of the first indication, the second indication, or the third indication, the at least one processor, individually or in any combination, is configured to receive, via at least one of the transceiver or the antenna, at least one of the first indication, the second indication, or the third indication via one of a physical broadcast channel (PBCH) or downlink control information (DCI).

Aspect 41 is an apparatus for wireless communication at a device including means for implementing any of aspects 17 to 24.

Aspect 42 is a computer-readable medium (e.g., a non-transitory computer-readable medium) storing computer executable code, where the code when executed by a processor causes the processor to implement any of aspects 17 to 24.

Aspect 43 is an apparatus for wireless communication at a device including a memory and at least one processor coupled to the memory and, based at least in part on information stored in the memory, the at least one processor is configured to implement any of aspects 25 to 30.

Aspect 44 is the apparatus of aspect 43, further including a transceiver or an antenna coupled to the at least one processor at least one of a transceiver or an antenna coupled to the at least one processor, wherein to receive at least one of the first indication, the second indication, or the third indication, the at least one processor, individually or in any combination, is configured to receive, via at least one of the transceiver or the antenna, at least one of the first indication, the second indication, or the third indication via one of a physical broadcast channel (PBCH) or downlink control information (DCI).

Aspect 45 is an apparatus for wireless communication at a device including means for implementing any of aspects 25 to 30.

Aspect 46 is a computer-readable medium (e.g., a non-transitory computer-readable medium) storing computer executable code, where the code when executed by a processor causes the processor to implement any of aspects 25 to 30.

What is claimed is:

1. An apparatus for wireless communication at a network device, comprising:

at least one memory; and at least one processor coupled to the at least one memory and, based at least in part on stored information that is stored in the at least one memory, the at least one processor is configured to:

transmit, to a backscatter-capable device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device;

receive, via the third frequency range, the UL trigger indicating that the backscatter-capable device has information to transmit;

transmit, in response to a reception of the UL trigger and via the first frequency range, a continuous wave (CW) DL transmission for backscattering from the backscatter-capable device; and receive, via the second frequency range, the information from the backscatter-capable device via the CW DL transmission backscattered by the backscatter-capable device.

2. The apparatus of claim 1, wherein the UL trigger is associated with a low-power signal, wherein the low-power signal is associated with at least one of a reduced modulation and coding scheme (MCS) index, a number of bits below a bit threshold, or a transmission power below a power threshold.

3. The apparatus of claim 2, wherein the UL trigger indicates one of a time-sensitivity of the information or a priority of the information.

4. The apparatus of claim 3, wherein the at least one processor is further configured to:

omit, based on one of the time-sensitivity of the information or the priority of the information, a non-CW DL transmission via the first frequency range in order to transmit the CW DL transmission.

5. The apparatus of claim 1, wherein the at least one processor is further configured to:

transmit, to the backscatter-capable device, a fourth indication of a time gap applied by the network device between the reception of the UL trigger and transmission of the CW DL transmission.

6. The apparatus of claim 1, wherein at least one of the second indication or the third indication comprises an indication of a frequency offset from the first frequency range.

7. The apparatus of claim 1, wherein the at least one processor is further configured to:

monitor the third frequency range for the UL trigger.

8. The apparatus of claim 1, further comprising at least one of a transceiver or an antenna coupled to the at least one processor, wherein to transmit at least one of the first indication, the second indication, or the third indication, the at least one processor is configured to transmit, via at least one of the transceiver or the antenna, at least one of the first indication, the second indication, or the third indication via one of a physical broadcast channel (PBCH) or downlink control information (DCI).

9. The apparatus of claim 1, wherein the third indication comprises an indication of a set of periodic time resources for transmission of the UL trigger.

10. The apparatus of claim 9, wherein a period associated with the set of periodic time resources is based on a latency associated with the backscatter-capable device.

11. An apparatus for wireless communication at a backscatter-capable device, comprising:

at least one memory; and at least one processor coupled to the at least one memory and, based at least in part on stored information that is stored in the at least one memory, the at least one processor is configured to:

receive, from a network device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device;

transmit, via the third frequency range, the UL trigger that indicates the backscatter-capable device has information to transmit;

receive, in response to the UL trigger and via the first frequency range, a continuous wave (CW) DL transmission; and backscatter, via the second frequency range, the CW DL transmission to include the information.

12. The apparatus of claim 11, wherein the UL trigger is associated with a low-power signal, wherein the low-power signal is associated with at least one of a reduced modulation and coding scheme (MCS) index, a number of bits below a bit threshold, or a transmission power below a threshold.

13. The apparatus of claim 12, wherein the UL trigger indicates one of a time-sensitivity of the information or a priority of the information.

14. The apparatus of claim 11, wherein the at least one processor is further configured to:

receive, from the network device, a fourth indication of a time gap applied by the network device between reception of the UL trigger and transmission of the CW DL transmission.

15. The apparatus of claim 11, wherein at least one of the second indication or the third indication comprises an indication of a frequency offset from the first frequency range.

16. The apparatus of claim 11, wherein the third indication comprises an indication of a set of periodic time resources for transmission of the UL trigger.

17. The apparatus of claim 16, wherein a period associated with the set of periodic time resources is based on a latency associated with the backscatter-capable device.

18. The apparatus of claim 11, further comprising at least one of a transceiver or an antenna coupled to the at least one processor, wherein to receive at least one of the first indication, the second indication, or the third indication, the at least one processor is configured to receive, via at least one of the transceiver or the antenna, at least one of the first indication, the second indication, or the third indication via one of a physical broadcast channel (PBCH) or downlink control information (DCI).

19. A method of wireless communication at a network device, comprising:

transmitting, to a backscatter-capable device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device;

receiving, via the third frequency range, the UL trigger indicating that the backscatter-capable device has information to transmit;

transmitting, in response to a reception of the UL trigger and via the first frequency range, a continuous wave (CW) DL transmission for backscattering from the backscatter-capable device; and receiving, via the second frequency range, the information from the backscatter-capable device via the CW DL transmission backscattered by the backscatter-capable device.

20. The method of claim 19, wherein the UL trigger is associated with a low-power signal, wherein the low-power signal is associated with at least one of a reduced modulation and coding scheme (MCS) index, a number of bits below a bit threshold, or a transmission power below a power threshold.

21. The method of claim 20, wherein the UL trigger indicates one of a time-sensitivity of the information or a priority of the information.

22. The method of claim 19, further comprising:

transmitting, to the backscatter-capable device, a fourth indication of a time gap applied by the network device between the reception of the UL trigger and transmission of the CW DL transmission.

23. The method of claim 19, wherein at least one of the second indication or the third indication comprises an indication of a frequency offset from the first frequency range.

24. A method of wireless communication at a backscatter-capable device, comprising:

receiving, from a network device, a first indication of a first frequency range associated with a downlink (DL) transmission, a second indication of a second frequency range associated with an uplink (UL) communication from the backscatter-capable device, and a third indication of a third frequency range associated with an UL trigger from the backscatter-capable device;

transmitting, via the third frequency range, the UL trigger that indicates the backscatter-capable device has information to transmit;

receiving, in response to the UL trigger and via the first frequency range, a continuous wave (CW) DL transmission; and backscattering, via the second frequency range, the CW DL transmission to include the information.

25. The method of claim 24, wherein the UL trigger is associated with a low-power signal, wherein the low-power signal is associated with at least one of a reduced modulation and coding scheme (MCS) index, a number of bits below a bit threshold, or a transmission power below a threshold.

26. The method of claim 25, wherein the UL trigger indicates one of a time-sensitivity of the information or a priority of the information.

27. The method of claim 24, further comprising:

receiving, from the network device, a fourth indication of a time gap applied by the network device between reception of the UL trigger and transmission of the CW DL transmission.

28. The method of claim 24, wherein at least one of the second indication or the third indication comprises an indication of a frequency offset from the first frequency range.

* * * * *